(12) United States Patent
Deemter et al.

(10) Patent No.: US 12,437,257 B2
(45) Date of Patent: Oct. 7, 2025

(54) SYSTEM AND METHOD FOR MANAGING THE DELIVERY OF A FOOD PRODUCT

(71) Applicant: Little Caesar Enterprises, Inc., Detroit, MI (US)

(72) Inventors: Kent A. Deemter, Hudsonville, MI (US); R. William Kneifel, II, West Bloomfield, MI (US); Matthew Omlor, Holt, MI (US); Rick Moreno, Detroit, MI (US); David Scrivano, South Lyon, MI (US); Dana Tilley, Detroit, MI (US)

(73) Assignee: Little Caesar Enterprises, Inc., Detroit, MI (US)

( * ) Notice: Subject to any disclaimer, the term of this patent is extended or adjusted under 35 U.S.C. 154(b) by 150 days.

(21) Appl. No.: 17/818,866

(22) Filed: Aug. 10, 2022

(65) Prior Publication Data

US 2022/0383250 A1     Dec. 1, 2022

Related U.S. Application Data

(63) Continuation of application No. 17/227,553, filed on Apr. 12, 2021, now Pat. No. 11,429,920, which is a
(Continued)

(51) Int. Cl.
*G06Q 10/0832*     (2023.01)
*A47J 36/24*     (2006.01)
(Continued)

(52) U.S. Cl.
CPC .......... *G06Q 10/0832* (2013.01); *A47J 36/24* (2013.01); *A47J 39/003* (2013.01);
(Continued)

(58) Field of Classification Search
CPC ..... G06Q 10/0832; G06Q 50/12; A47J 36/24; F24C 7/08; G07C 9/00912
See application file for complete search history.

(56) References Cited

U.S. PATENT DOCUMENTS

| 1,522,932 | A | 1/1925 | Zsoldos |
| 4,894,717 | A | 1/1990 | Komei |

(Continued)

FOREIGN PATENT DOCUMENTS

WO     WO-2015034868 A1     3/2015

OTHER PUBLICATIONS

Todd Bishop, "Exclusive: Hands-on with Amazon Locker, now working", Oct. 12, 2011, GeekWire, https://www.geekwire.com/2011/exclusive-handson-amazon-locker-running/ (Year: 2011).*
(Continued)

*Primary Examiner* — Nabil H Syed
(74) *Attorney, Agent, or Firm* — Honigman LLP

(57) ABSTRACT

A food locker includes a housing, a food support member, a first door, a second door, and a lock. The housing includes a front wall a front wall, a rear wall, and a chamber. The front wall includes a first opening in communication with the chamber. The rear wall includes a second opening in communication with the chamber. The food support member is disposed within the chamber. The first door is supported by the housing and is movable between a closed position and an open position. The food support member is accessible through the first opening when the first door is in the open position. The second door is supported by the housing and is movable between a closed position and an open position. The food support member is accessible through the second opening when the second door is in the open position. The lock is operatively coupled to at least one of the housing and the first door and is actuatable between a locked configuration and an unlocked configuration. The lock is operable to (i) permit the first door to move from the closed position to the open position when the lock is in the unlocked configuration and (ii) prevent the first door from moving from the
(Continued)

closed position to the open position when the lock is in the locked configuration.

4 Claims, 13 Drawing Sheets

Related U.S. Application Data continuation of application No. 16/552,899, filed on Aug. 27, 2019, now Pat. No. 10,977,600, which is a continuation of application No. 16/077,302, filed as application No. PCT/US2017/017679 on Feb. 13, 2017, now Pat. No. 10,546,267.

(60) Provisional application No. 62/294,728, filed on Feb. 12, 2016.

(51) Int. Cl.
| | |
|---|---|
| *A47J 39/00* | (2006.01) |
| *A47J 39/02* | (2006.01) |
| *F24C 7/08* | (2006.01) |
| *G06Q 50/12* | (2012.01) |
| *G07C 9/00* | (2020.01) |
| *G07F 17/00* | (2006.01) |
| *G07F 17/12* | (2006.01) |

(52) U.S. Cl.
CPC ............... *A47J 39/02* (2013.01); *F24C 7/08* (2013.01); *G06Q 50/12* (2013.01); *G07C 9/00912* (2013.01); *G07F 17/0014* (2013.01); *G07F 17/12* (2013.01)

(56) References Cited

U.S. PATENT DOCUMENTS

| | | |
|---|---|---|
| 5,579,952 A | 12/1996 | Fiedler et al. |
| 10,482,525 B2 | 11/2019 | Mueller et al. |
| 2002/0035515 A1 | 3/2002 | Moreno |
| 2005/0205081 A1 | 9/2005 | Barker et al. |
| 2007/0125100 A1 | 6/2007 | Shoenfeld |
| 2011/0252813 A1 | 10/2011 | Veltrop |
| 2012/0086314 A1 | 4/2012 | Bourke et al. |
| 2014/0083309 A1 | 3/2014 | Reese et al. |
| 2015/0112887 A1* | 4/2015 | Camp ............... G06Q 10/0836 705/339 |
| 2015/0178676 A1* | 6/2015 | Carr ................. G06Q 10/0836 705/332 |

OTHER PUBLICATIONS

Vegetarian Dude, "14 Awesome Organic Food Items You Can Get on Amazon Prime", Sep. 2, 2013, https://web.archive.org/web/20140421233126/https://www.vegetariandude.com/14-awesome-organic-food-items-amazon-prime/ (Year: 2013).*
International Search Report and Written Opinion for Application No. PCT/US2017/017679 dated Aug. 16, 2017.
Non-Final Office Action dated Feb. 25, 2020, from the U.S. Patent and Trademark Office relating to U.S. Appl. No. 16/552,899.
Final Office Action dated Jun. 16, 2020, from the U.S. Patent and Trademark Office relating to U.S. Appl. No. 16/552,899.
Advisory Action dated Sep. 2, 2020, from the U.S. Patent and Trademark Office relating to U.S. Appl. No. 16/552,899.
Non-Final Office Action dated Sep. 22, 2020, from the U.S. Patent and Trademark Office relating to U.S. Appl. No. 16/552,899.
Non-Final Office Action dated Feb. 9, 2022, from the U.S. Patent and Trademark Office relating to U.S. Appl. No. 17/227,553.

* cited by examiner

SYSTEM AND METHOD FOR MANAGING THE DELIVERY OF A FOOD PRODUCT

CROSS REFERENCE TO RELATED APPLICATIONS

This U.S. patent application is a continuation of, and claims priority under 35 U.S.C. § 120 from, U.S. patent application Ser. No. 17/227,553, filed on Apr. 12, 2021, which is a continuation of U.S. patent application Ser. No. 16/552,899, filed on Aug. 27, 2019, which is a continuation of U.S. patent application Ser. No. 16/077,302, filed on Aug. 10, 2018, which is a National Phase Application of International Application No. PCT/US2017/017679, filed on Feb. 13, 2017, which claims the benefit of U.S. Provisional Application 62/294,728, filed on Feb. 12, 2016. The disclosures of these prior applications are considered part of the disclosure of this application and are hereby incorporated by reference in their entireties.

TECHNICAL FIELD

This disclosure relates to a system and method for managing the delivery of a food product, and more particularly to a system and method for securing an ordered food product and/or maintaining a temperature of an ordered food product prior to delivery.

BACKGROUND

This section provides background information related to the present disclosure and is not necessarily prior art. Restaurants and other establishments that supply prepared (e.g., cooked-to-order) food products to customers often find it desirable to prepare the food product in advance of serving the food product to the customer. For example, restaurants offering carryout or take-out food service often prepare an ordered food product before the customer arrives at the restaurant to pick up the food product. In these situations, the restaurant may place the prepared food in a staging or waiting area where it can remain until it is picked up by the customer. While known systems and methods for handling and delivering prepared food products have proven acceptable for their intended use, a continuous need in the relevant art remains for improved systems and methods for ordering, handling, and delivering prepared food products.

SUMMARY

This section provides a general summary of the disclosure, and is not a comprehensive disclosure of its full scope or all of its features.

According to one aspect, the present disclosure provides a food locker. The food locker may include a housing, a food support member, a first door, a second door, and a lock. The housing may include a front wall a front wall, a rear wall, and a chamber. The front wall may include a first opening in communication with the chamber. The rear wall may include a second opening in communication with the chamber. The food support member may be disposed within the chamber. The first door may be supported by the housing and may be movable between a closed position and an open position. The food support member may be accessible through the first opening when the first door is in the open position. The second door may be supported by the housing and may be movable between a closed position and an open position. The food support member may be accessible through the second opening when the second door is in the open position. The lock may be operatively coupled to at least one of the housing and the first door and may be actuatable between a locked configuration and an unlocked configuration. The lock may be operable to (i) permit the first door to move from the closed position to the open position when the lock is in the unlocked configuration and (ii) prevent the first door from moving from the closed position to the open position when the lock is in the locked configuration.

In some implementations, the food locker includes a first heater disposed within the housing. The first heater may be coupled to the food support member and may include a fan and a heating element.

In some implementations, the food locker includes a second heater. The first heater may be disposed on a first side of the housing and the second heater may be disposed on a second side of the housing opposite the first side.

In some implementations, the food locker includes a first air intake and a second air intake. The first air intake may be disposed on the first side of the housing. The second air intake may be disposed on the second side of the housing. The first air intake may be in fluid communication with the first heater. The second air intake may be in fluid communication with the second heater.

In some implementations, the housing includes a first duct and a second duct. The first duct may extend from the first air intake to the first heater. The second duct may extend from the second air intake to the second heater. The first duct may be disposed in a medial wall of the housing. The second duct may be disposed in a lateral wall of the housing. The medial wall may be opposite the lateral wall.

In some implementations, the food locker includes a first input device operable to actuate the lock from the locked configuration to the unlocked configuration. The first input device may include a touchscreen. The touchscreen may be supported by one of the first door and the front wall of the housing. In some implementations, first input device includes at least one of a phone and a tablet computing device.

In some implementations, the food locker includes a locker control module supported by the housing. In some implementations, the first input device is operable to wirelessly communicate with the locker control module.

In some implementations, the food locker includes a second input device operable to actuate the lock from the unlocked configuration to the locked configuration. The second input device may include a scanner. The scanner may be disposed on the rear wall of the housing.

In some implementations, the food support member includes a lower plate and a rack supported by the lower plate. The rack and the lower plate may define an air flow passage therebetween.

In some implementations, the food support member may be operable to move from a stowed position to a deployed position through the first opening. A proximal portion of the food support may be disposed outside of the chamber when the food support is in the deployed position. A distal portion of the food support may be disposed within the chamber when the food support is in the deployed position.

In some implementations, the first door is pivotally coupled to the housing.

In some implementations, the food locker includes an indicator operable to transmit at least one of a visual signal and an audible signal. The indicator may include a display disposed on the housing. The visual signal may include a username associated with a user.

According to another aspect, the present disclosure provides a food locker. The food locker may include a housing, a first door, a food support member, and a lock. The housing may include a chamber and a first opening in communication with the chamber. The first door may be movably coupled to the housing. The first door may be movable from a closed position to an open position relative to the housing. The first door may prevent access to the chamber through the first opening in the closed position. The food support member may be disposed within the chamber and may be supported by the housing. The food support member may be translatable from a stowed configuration to an ejected configuration. The food support member may extend from the first opening in the ejected configuration. The lock may be operatively connected to at least one of the housing and the first door and may be actuatable between a locked configuration and an unlocked configuration. The lock may be operable to prevent the first door from moving to the open position when the lock is in the locked configuration.

According to yet another aspect, the present disclosure provides a method of managing the delivery of a food product with a food locker system. In some implementations, the method includes receiving an order for a food product from an ordering device. The method may also include preparing the food product associated with the order. The method may further include placing the food product in a food locker. The food locker may include a locker control module and a first door covering a first opening. In some implementations, the method includes transmitting an identification code to the ordering device. The identification code may be associated with the order for the food product. The method may also include transmitting the identification code from at least one of the ordering device and a user input device to the locker control module. The method may further include unlocking the first door such that the food product is accessible through the first opening.

In some implementations, transmitting the identification code from at least one of the ordering device and a user input device includes wirelessly transmitting the identification code from the ordering device to the food locker system.

In some implementations, the user input device may be supported by the food locker. Transmitting the identification code may include entering the identification code into the user input device.

In some implementations, the method includes ejecting the food product through the first opening.

In some implementations, the method includes activating an indicator associated with the food locker. The indicator may include at least one of a speaker, a display, and a light associated with the food locker. Activating the indicator may include playing a sound on the speaker. Playing the sound may include reciting a username associated with a user. In some implementations, activating the indicator include displaying a name of a user on the display. In some implementations, activating the indicator includes illuminating a light.

In some implementations, the method includes scanning an identification code associated with the order for the food product.

In some implementations, the method includes activating a heater disposed in the food locker.

In some implementations, the method includes instructing an employee to place the food product in the food locker.

In some implementations, the method includes transmitting a location of the locker to the ordering device.

In some implementations, the method includes receiving a second order for a food product from a second ordering device. The method may also include preparing the food product associated with the second order. The method may further include placing the food product associated with the second order in a second food locker.

In some implementations, the method may include assigning the food product to the food locker based on one of (i) the quantity of the food product and (ii) the height of a consumer associated with the order for the food product.

According to yet another aspect, the present disclosure provides a method of managing the delivery of a food product with a food locker system. The method may include receiving an order for a food product from an ordering device. The method may also include preparing the food product. The method may further include placing the food product in a food locker. In some implementations, the method includes activating a heater disposed within the food locker. The method may also include removing the food product from the food locker and selecting a reason for removing the food product from the food locker. The reason for removing the food product from the food locker may include one of (i) expiration of a predetermined amount of time and (ii) delivering the food product to a customer.

In some implementations, the method may include scanning an identification code associated with the order for the food product.

According to a further aspect, the disclosure provides a food management system. The food management system may include a first ordering device (e.g, a smartphone, tablet computer, or other similar device) associated with a user (e.g., a customer), a receiving system (e.g., a computer or related network) associated with an establishment (e.g, a restaurant), and a locker system for storing an ordered food product (e.g., a pizza). One of the first ordering device and a second ordering device may communicate with the receiving device and the locker system. In some implementations, the user may enter an order for the ordered food product on the ordering device and transmit the order from the ordering device to the receiving device. The establishment may produce (e.g., cook) the ordered food product. An employee may scan an identification label on the ordered food product and place the ordered food product in a locker of the locker system. For example, the employee may open a door on a rear side of the locker and place the food product in the locker. The locker may include one or more heaters to maintain a temperature of the ordered food product for a determined amount of time. Prior to expiration of the predetermined amount of time, the user may open a door on a front side of the locker to remove the ordered food product. In particular, in some implementations, the ordering device may wirelessly communicate with the locker to unlock the door on the front side of the locker. In other implementations, the user may enter a code on a user input device associated with the locker in order to unlock the door on the front side of the locker. Subsequent to expiration of the predetermined amount of time, the employee may be notified to remove the ordered food product from the locker if the user has not already removed the ordered food product. In particular, the employee may remove the ordered food product through the door on the rear side of the locker and subsequently dispose of the ordered food product or deliver the ordered food product to the customer.

The details of one or more implementations of the disclosure are set forth in the accompanying drawings and the description below. Other aspects, features, and advantages will be apparent from the description and drawings, and from the claims. The description and specific examples in this summary are intended for purposes of illustration only and are not intended to limit the scope of the present disclosure.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1A:
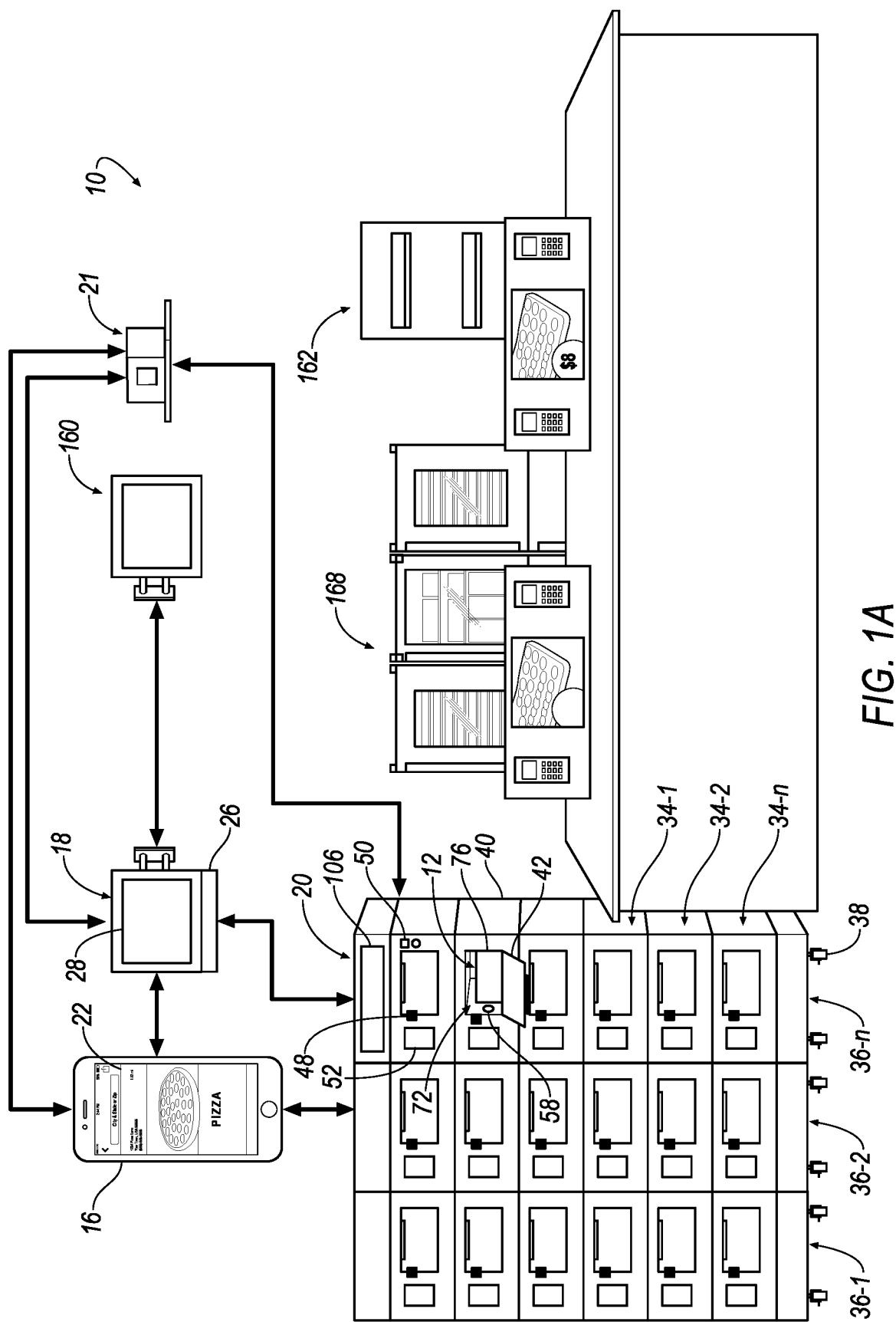
FIG. 1A is a perspective view of an example food management system in accordance with the principles of the present disclosure.
Figure 1B:
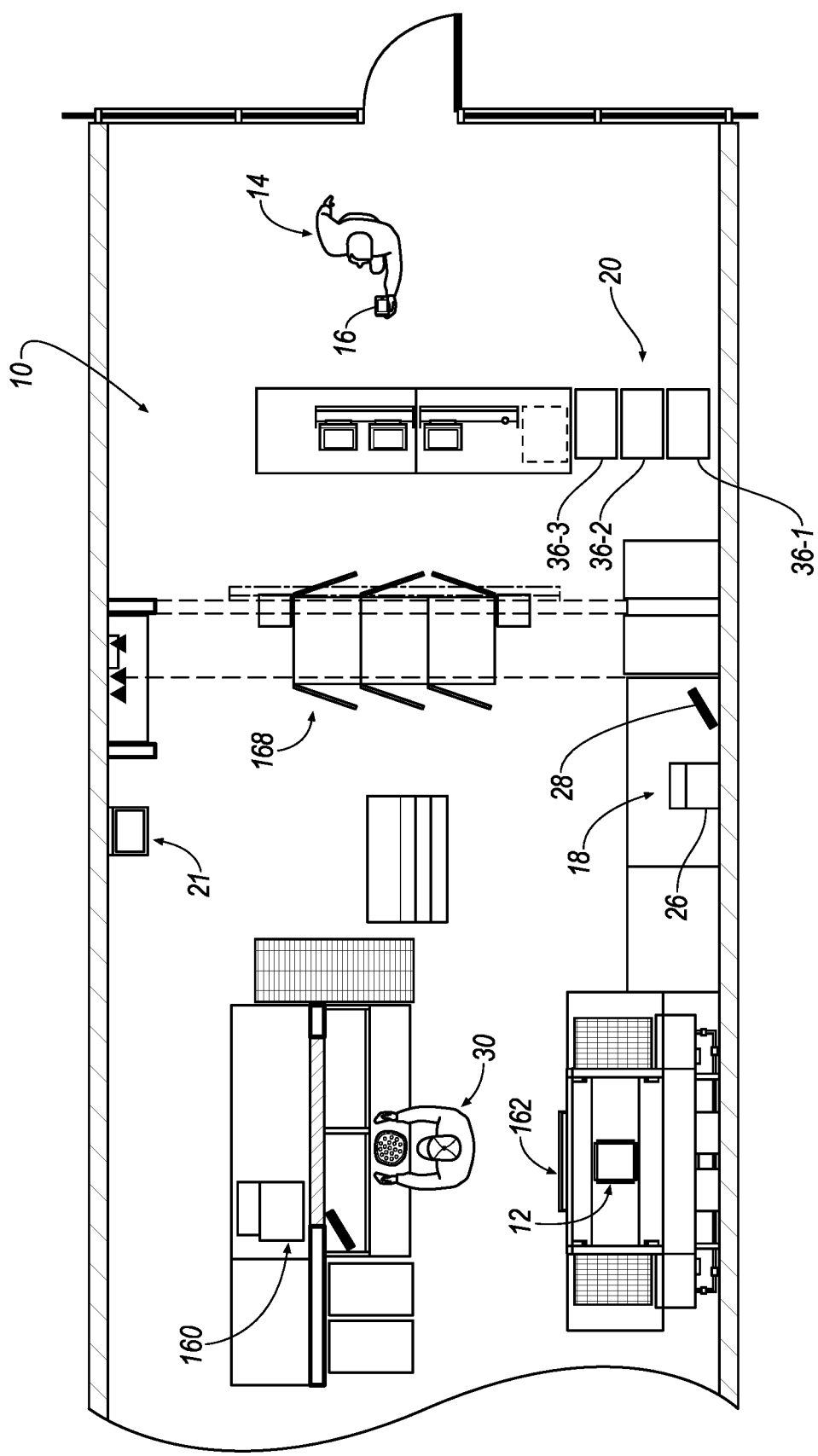
FIG. 1B is a plan view of the food management system of FIG. 1A.

Referring to FIGS. 1A and 1B, a food management system 10 is illustrated in accordance with the principles of the present disclosure. The food management system 10 may be disposed in, and utilized by, a restaurant or other similar establishment to manage the ordering of food products 12 by, and the delivery of food products 12 to, a user 14 such as, for example, a consumer or a third party delivery service. For example, in some implementations the food management system 10 may be utilized by a pizza-making restaurant. In this regard, while the food products 12 may be generally shown and described herein as beings pizzas, breadsticks, chicken, and sauces, for example, it will be appreciated that the food products 12 may include other items within the scope of the present disclosure.

The food management system 10 may include one or more ordering devices 16, a receiving system or device 18, and a locker system 20. The ordering device 16 may be in communication with the receiving device 18 and the locker system 20. In this regard, the ordering device 16, the receiving device 18, and the locker system 20 may communicate with and through a central processing system or server 21 (e.g., CAESARVISION®) using wired communication and/or one or more wireless communication protocols, such as WiFi, LTE, near field communication, BLUETOOTH®, or BLE® for example. In some implementations the ordering device 16 may include a mobile communication device, such as a phone, a tablet computer, or any other suitable computing device that allows the user 14 to place an order for one or more food products 12 by communicating with the receiving device 18. For example, the ordering device 16 may include software, such as an ordering application 22 that allows the user 14 to input an order for the food products 12 and transmit the order to the receiving device 18. In particular, the ordering device 16 may communicate the order through one or more wireless communication protocols to the receiving device 18 and/or the locker system 20. For example, in some implementations the ordering device 16 may transmit the order for one or more food products 12 to the receiving device 18 via a wired or wireless (e.g., radio transmissions or electromagnetic radio fields) communication protocol. For example, the ordering device 16 may communicate with the receiving device 18 via WiFi, LTE, near field communication, BLUETOOTH®, BLE®, etc.

The receiving device 18 may include a communication module 26 and a user interface 28 and may be in communication with the ordering device 16 and the locker system 20. For example, the communication module 26 may receive an order for food products 12 from the ordering device 16 and/or the locker system 20. In some implementations, the communication module 26 may receive the order for food products 12 from the ordering device 16 through the ordering application 22. The communication module 26 may transmit the order to, and/or display the order on, the user interface 28 where it can be received by an employee 30 or other person affiliated with the restaurant or establishment. In this regard, the user interface 28 may include a screen or suitable display for displaying the order to the employee 30.

Figure 2A:
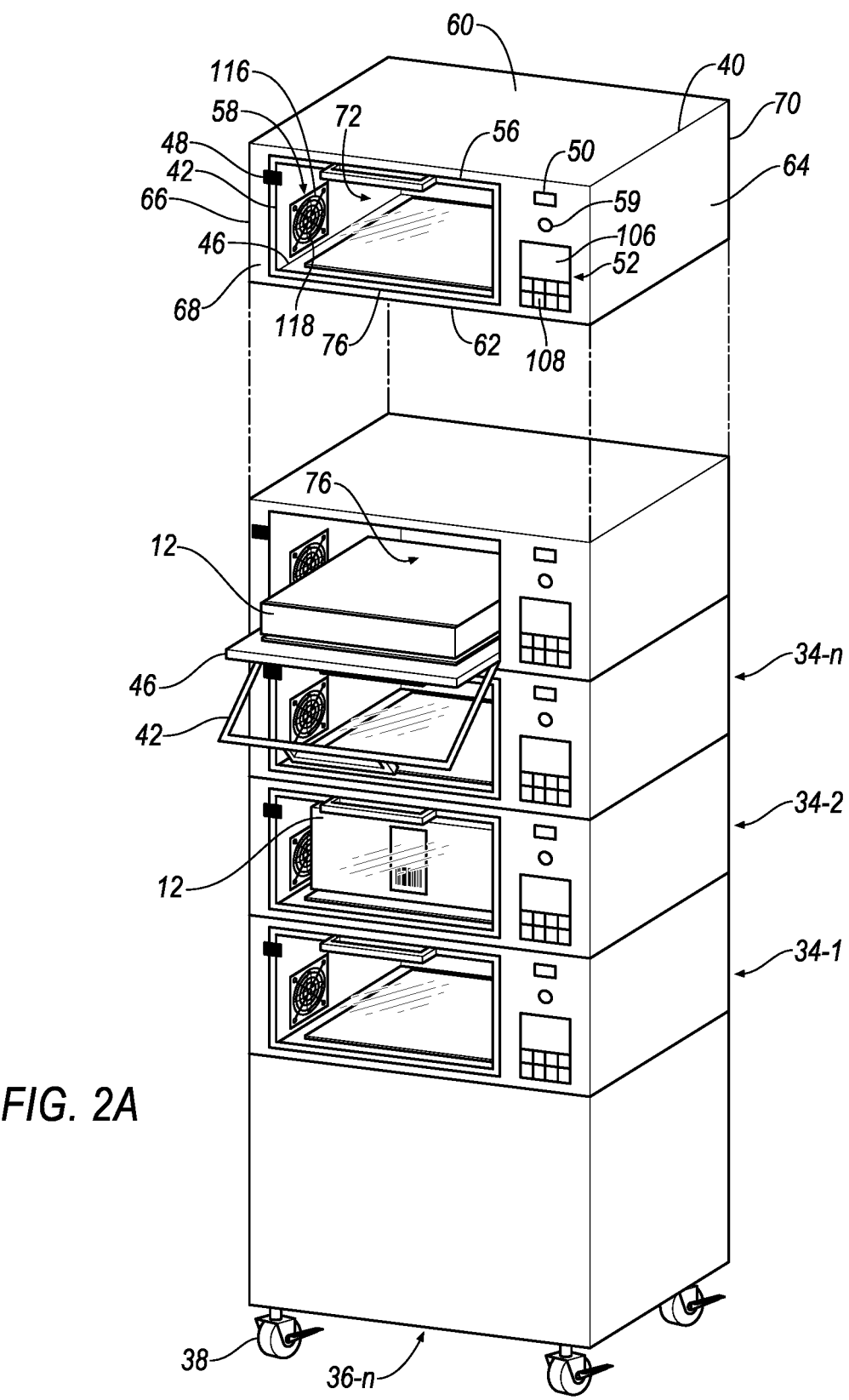
FIG. 2A is a front perspective view of an example food locker system in accordance with the principles of the present disclosure.
Figure 2B:
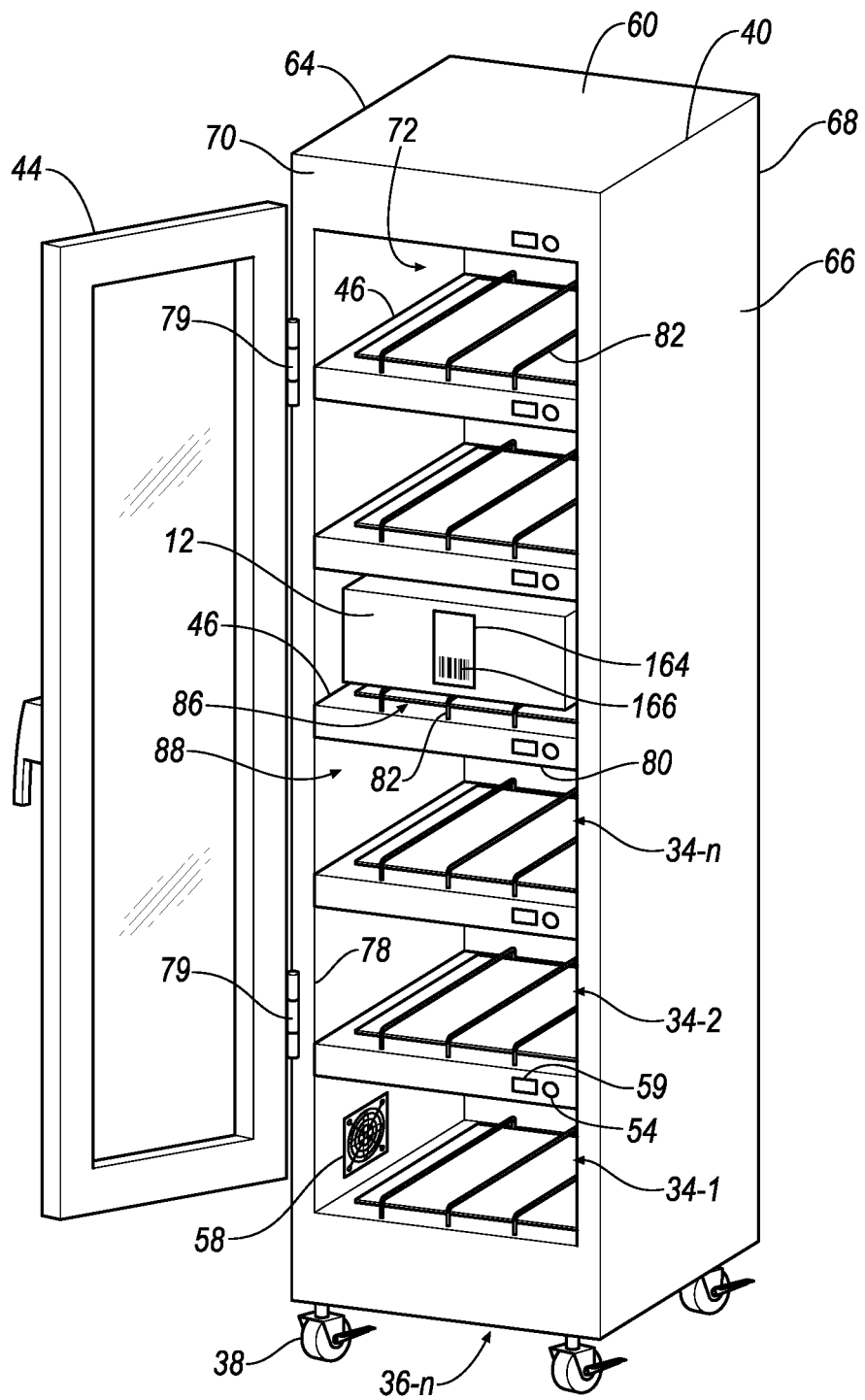
FIG. 2B is a rear perspective view of an example food locker system in accordance with the principles of the present disclosure.

The locker system 20 may include one or more lockers 34-1, 34-2, . . . 34-n. As illustrated in FIGS. 1A and 1B, in some implementations, the lockers 34-1, 34-2, . . . 34-n may be arranged in one or more columns and/or stacks 36-1, 36-2, . . . 36-n. In this regard, while the locker system 20 is shown and described herein as including three stacks 36-1, 36-2, 36-3, with each stack 36-1, 36-2, 36-3 including six lockers 34-1, 34-2, 34-3, 34-4, 34-5, 34-6, it will be appreciated that the locker system 20 may include more or less than three stacks 36-n, and each stack 36-n may include more or less than six lockers 34-n, within the scope of the present disclosure. For example, as illustrated in FIGS. 1A and 2A, each stack 36-n may include one or more wheels 38 such that stacks 36-n can be readily removed from, or added to, the locker system 20. In addition, as further illustrated in FIG. 2A, in some implementations each locker 34-n may be removably stacked on an adjacent (e.g., lower) locker 34-n such that individual locker(s) 34-n can be readily removed from, or added to, the stack 36-n in order to increase or decrease the height of the stack 36-n. As illustrated in FIG. 2B, in some implementations, one or more of the lockers 34-n may be integrally formed with one or more adjacent (e.g., above and/or below) lockers 34-n, such that at least a portion of the stack 36-n includes a fixed quantity of lockers 34-n.

Except as otherwise provided herein, each stack 36-n may be substantially similar to the others of the stacks 36-n, and each locker 34-n may be substantially similar to the others of the lockers 34-n. Accordingly, references herein to the stack 36 will be understood to apply equally to each of the one or more stacks 36-1, 36-2, . . . 36-n, except as otherwise shown or described. Likewise, references herein to the locker 34 will be understood to apply equally to each of the one or more lockers 34-1, 34-2, . . . 34-n, except as otherwise shown or described.

With reference to FIGS. 2A and 2B, each locker 34 and/or stack 36 of lockers 34 may include a housing 40, a first door 42, a second door 44, a food support 46, a locking mechanism 48, a locker control module 50, a user input device 52, a provider input device 54, an indicator 56, one or more heaters 58, and a timer 59. In some implementations, the housing 40 may include an upper wall 60, a lower wall 62, a lateral wall 64, a medial wall 66, a front wall 68, and a rear wall 70. The upper, lower, lateral, medial, front, and rear walls 60, 62, 64, 66, 68, 70 may surround and/or define a chamber 72. In this regard, the upper wall 60 may be opposite the lower wall 62, the lateral wall 64 may be opposite the medial wall 66, and the front wall 68 may be opposite the rear wall 70. While the housing 40 is shown and described herein as defining a substantially rectangular prism it will be appreciated that the housing 40 may define other shapes surrounding the chamber 72 within the scope of the present disclosure.

As illustrated in FIG. 1A, the front wall 68 may include one or more front openings 76 in communication with the chamber 72. In this regard, the front opening 76 may allow the user 14 to access the chamber 72. With reference to FIG. 2B, the rear wall 70 may include one or more rear openings 78 in communication with the chamber 72. In this regard, the rear opening 78 may allow the employee 30 to access the chamber 72.

The first door 42 may be movably coupled to the housing 40 such that the first door 42 (i) prevents access to the chamber 72 through one of the front openings 76 in a closed position and (ii) allows access to the chamber 72 through the front opening 76 in an open position. In this regard, each locker may further include a sensor to detect whether the door 42 is in the open position or the closed position, and a corresponding signal (e.g., a light) to indicate whether the door is in the open position or the closed position.

In some implementations, the first door 42 may be pivotally coupled to one of the upper, lower, lateral, medial, and front walls 60, 62, 64, 66, 68 by one or more hinges (not shown) such that the first door 42 rotates from the closed position to the open position. In other implementations, the first door 42 may be translatably coupled to the housing 40 by a track, guide, or other suitable device, such that the first door 42 translates from the closed position to the open position.

In some configurations, the first door 42 may be biasingly coupled to the housing 40. In this regard, the locker system 20 may further comprise a biasing member (not shown) such as a tension spring, a compression spring, a torsion spring, or other similar type device. The biasing member may bias the first door 42 into the open and/or closed position. For example, in some implementations, the biasing member may bias the first door 42 into the closed position such that, after the user 14 has removed the food product 12 from the chamber 72, the biasing member closes the first door 42. In other implementations, the biasing member may bias the first door 42 into the open position such that, upon receiving access to a particular locker 34, the biasing member opens the first door 42, thus allowing the user 14 to remove the food product 12 from the chamber 72.

With reference to FIG. 2B, the second door 44 may be movably coupled to the housing 40 such that the second door 44 (i) prevents access to the chamber 72 through the rear opening 78 in a closed position and (ii) allows access to the chamber 72 through the rear opening 78 in an open position. In some implementations, the second door 44 may be pivotally coupled to one of the upper, lower, lateral, medial, and rear walls 60, 62, 64, 66, 70 by one or more hinges 79 such that the second door 44 rotates from the closed position to the open position. In other implementations, the second door 44 may be translatably coupled to the housing 40 by a track, guide, or other suitable device, such that the second door 44 translates from the closed position to the open position.

As illustrated in FIGS. 2A and 2B, the food support 46 may be located within the chamber 72 such that the food support 46 can hold the food products 12. For example, the food support 46 may be positioned parallel to the lower wall 62. In this regard, in some implementations each food support 46 may be integrally formed with and/or supported by the lower wall 62 of each food locker 34.

Figure 2C:
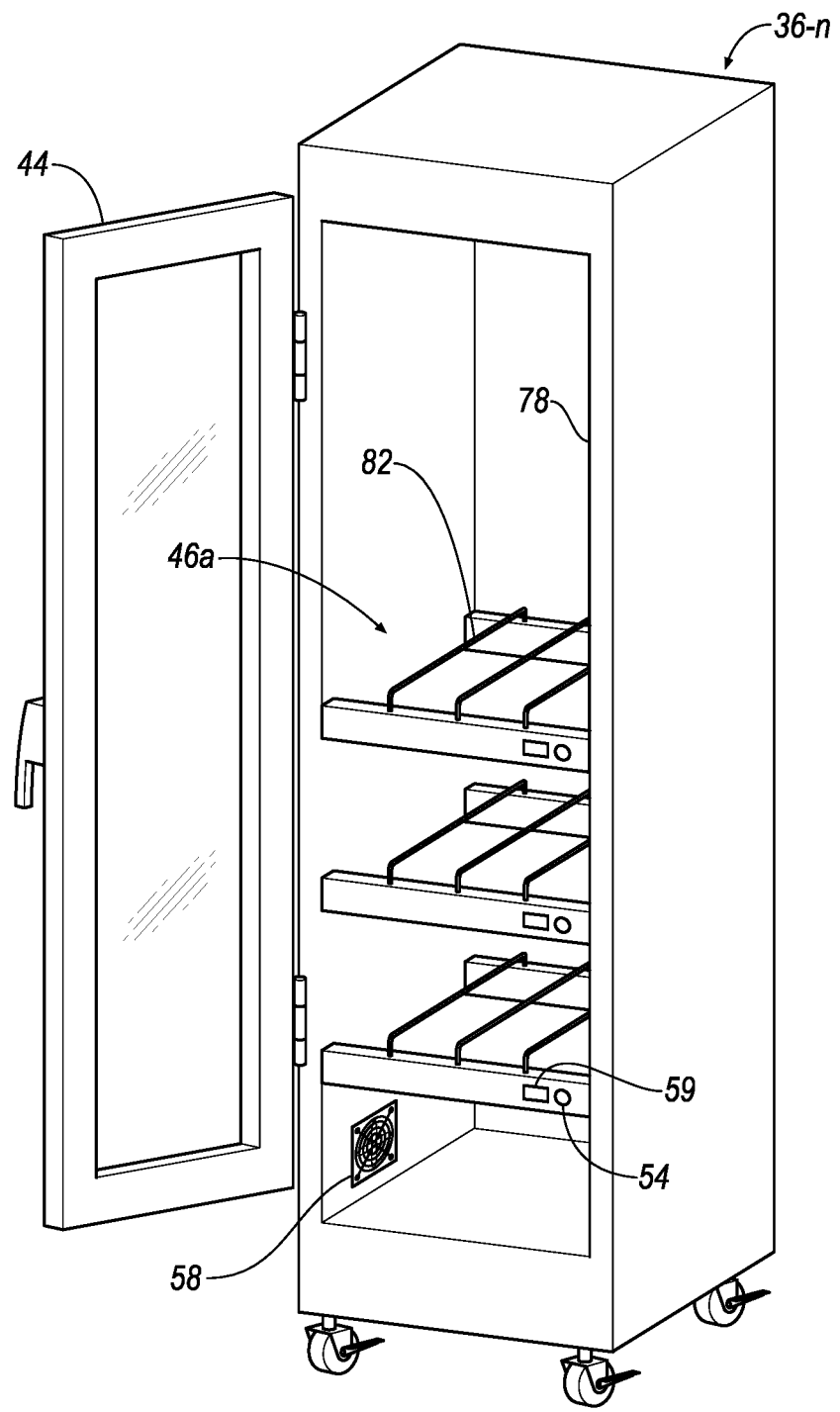
FIG. 2C is another rear perspective view of an example food locker system in accordance with the principles of the present disclosure.
Figure 3:
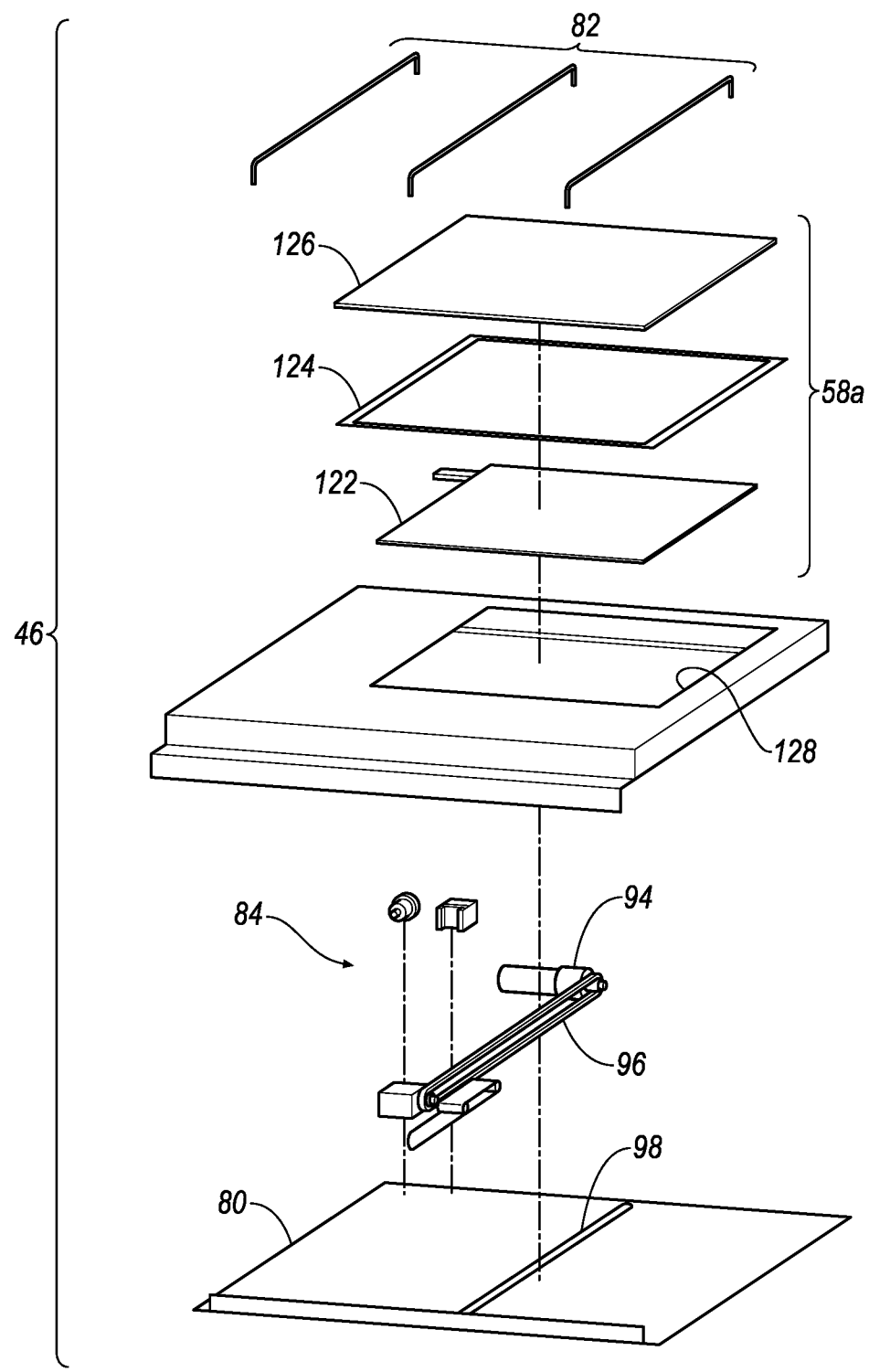
FIG. 3 is an exploded view of an example food support in accordance with the principles of the present disclosure.

With reference to FIG. 3, in some implementations the food support 46 may include a lower cover 80, a rack 82, and an ejection mechanism 84. In an assembled configuration, the lower cover 80 may be disposed between, and substantially parallel to, the upper wall 60 and the lower wall 62. The rack 82 may be disposed between, and substantially parallel to, the upper wall 60, the lower wall 62, and/or the lower cover 80. For example, as illustrated in FIG. 2B, the rack 82 and the lower cover 80 and/or the lower wall 62 of a first of the lockers 34 may define a lower air flow passage 86 extending from the front wall 68 to the rear wall 70 and from the lateral wall 64 to the medial wall 66, while the lower cover 80 and the rack 82 of an adjacent locker 34 may define an upper air flow passage 88 extending from the front wall 68 to the rear wall 70 and from the lateral wall 64 to the medial wall 66. In some implementations, the locker 34 may be formed without the upper wall 60, the lower wall 62, and/or the lower cover 80, such that the chamber 72 of a locker 34 can fluidly communicate through the rack 82 with the chamber 72 of an adjacent locker 34. For example, as illustrated in FIG. 2C, in some configurations, a food support 46a may include only the rack 82.

The ejection mechanism 84 may be supported by the housing 40 and configured to eject at least a portion of the food support 46 from the chamber 72 when the first door 42 is in the open position (e.g., FIG. 2A). For example, when the first door 42 is in the open position, the ejection mechanism 84 can move the food support 46 through the first opening 76 from a stowed configuration within the chamber 72 to an ejected orientation. In some implementations, the ejection mechanism 84 may be disposed between the food support 46 and the lower wall 62 of the housing 40. In other implementations, the ejection mechanism 84 may be disposed between the lower cover 80 and the rack 82.

As illustrated in FIG. 3, the ejection mechanism 84 may include an actuator 94 (e.g., a motor) and a driver 96 (e.g., a chain, a gear, a belt, etc.). The actuator 94 may be operatively coupled to the driver 96 and the driver 96 may be operatively coupled to a portion (e.g., the lower cover 80) of the food support 46. In some implementations, the food support 46 (e.g., the lower cover 80 or the rack 82) may include a coupling mechanism 98 (e.g., a track, a gear, a pulley, etc.) operatively coupled to the driver 96, such that upon actuation of the actuator 94, the driver 96 engages the coupling mechanism 98 to move the food support 46 into or out of the chamber 72 through the first opening 76. In particular, upon, or subsequent to, moving the first door 42 from the closed configuration to the open configuration, the driver 96 may eject at least a portion of the food support 46 from the chamber 72 through the first opening 76. Conversely, upon, or prior to, moving the first door 42 from the open configuration to the closed configuration, the driver 96 may retract at least a portion of the food support 46 into the stowed configuration within the chamber 72 through the first opening 76.

With reference to FIGS. 1A and 2A, the locking mechanism 48 may be coupled to one of the housing 40 and the first door 42 such that the locking mechanism 48 can be selectively engaged with the other of the housing 40 and the first door 42. In particular, the locking mechanism 48 may be actuatable from a locked configuration to an unlocked configuration, and vice versa, in order to selectively lock the first door 42 relative to the housing 40, and thus prevent the first door 42 from opening, relative to the housing 40. In this regard, the locking mechanism 48 can prevent the user 14 from accessing the chamber 72 through the front opening 76 when the front door 42 is in the closed position and the locking mechanism 48 is in the locked configuration.

The locking mechanism 48 may include any of a variety of locking mechanisms known to those of skill in the art. For example, in some implementations the locking mechanism 48 may include a hook or pin (not shown) that is coupled to one of the housing 40 and the first door 42 and can be selectively engaged in the locked configuration with a rod or aperture, respectively, that is disposed on the other of the housing 40 and the first door 42. In other implementations, the locking mechanism may include an electromagnet (not shown) that is coupled to one of the housing 40 and the first door 42 and can be selectively magnetized in the locked configuration to secure the electromagnet relative to a plate or other element that is disposed on the other of the housing 40 and the first door 42.

The locker control module 50 may be coupled to, and/or in electronic communication with, the locking mechanism 48, the user input device 52, the provider input device 54, the heater 58, the ejection mechanism 84, the ordering device 16, and/or the receiving device 18. For example, in some implementations, the locker control module 50 may communicate with the locking mechanism 48 in order to move the locking mechanism 48 from the locked configuration to the unlocked configuration, and vice versa. In this regard, as will be explained in more detail below, during operation of the food management system 10, the locker control module 50 may (i) receive information (e.g., an identification code) through the server 21 from one or more of the ordering device 16, the receiving device 18, and the user input device 52, and (ii) send information (e.g., an activation signal) to the locking mechanism 48. In particular, the locker control module 50 may actuate the locking mechanism 48 between the locked and unlocked configurations in response to a signal from one or more of the ordering device 16, the receiving device 18, and the user input device 52.

As illustrated in FIG. 2A, the user input device 52 may include one or more of a touchscreen 106 and a keypad 108. While the user input device 52 is illustrated as being located on the front wall 68 of the housing 40, it will be appreciated that at least a portion of the user input device 52 (e.g., the touchscreen 106) may be located on an outer surface of the first door 42. In some implementations, the user input device (e.g., the touchscreen 106) may be located proximate to the upper wall 60 on the front wall 68 of the housing 40 (FIG. 1A). The user input device 52 may communicate with the ordering device 16 and/or the locker control module 50 in order to actuate the locking mechanism 48. For example, in some implementations the user input device 52 may receive an input from the user 14 and/or the ordering device 16 and transmit an activation signal to the locker control module 50. In this regard, the user input device 52 may transmit an unlock signal to the locker control module 50.

With reference to FIG. 2B, the provider input device 54 may include one or more of a touchscreen, a keypad, and a sensor located on the rear wall 70 of the housing 40. For example, in some implementations the provider input device 54 may include a sensor such as a laser barcode scanner and/or a camera. The provider input device 54 may communicate with the locker control module 50 in order to actuate the locking mechanism 48. For example, in some implementations the provider input device 54 may receive an input (e.g., scanning a barcode or quick-response code on the food product 12) from the employee 30 and transmit an activation signal to the locker control module 50. In this regard, the provider input device 54 may transmit a lock signal to the locker control module 50.

With reference to FIG. 2A, the indicator 56 may include one or more of a variety of devices for selectively identifying one or more of the lockers 34-n. In this regard, the indicator 56 may produce a visual, audible, or tactile signal that allows the user 14 to identify one or more of the lockers 34-n. For example, in some implementations, the indicator 56 may include one or more lights that produce a visible light on the first door 42 and/or on the front wall 68 of a particular locker 34 in order to identify the particular locker 34 for the user 14. The indicator 56 may be in communication with one or more of the ordering device 16, the locker control module 50, and the user input device 52. In this regard, as will be explained in more detail below, upon receipt of an activation signal from one or more of the ordering device 16, the locker control module 50, and the user input device 52, the indicator 56 may produce the visual, audible, and/or tactile signal to identify a particular one or more of the lockers 34.

With reference to FIGS. 2A-2D, the heater 58 may be disposed within the chamber 72 of the housing 40 in order to selectively increase the temperature of one or more of the lockers 34, including the food products 12 therein, through one or more modes of heat transfer, including convection, conduction, radiation (e.g., microwaves), and/or diffusion, for example. In this regard, the heater 58 may include a heating element 116 (e.g., a filament) and a fan 118 to transfer heat to one or more of the lockers 34. In some implementations, each of the lockers 34 may include at least one heater 58 such that each heater 58 can be selectively activated in order to increase the temperature of the locker 34 in which the heater(s) 58 and food products 12 are located.

As illustrated in FIG. 2B, in some implementations, the stack 36 may include a single heater 58 such that the heater 58 can be selectively activated in order to increase the temperature of one or more (e.g., all) of the lockers 34 in the stack 36 in which the heater 58 is located. In this regard, the heater 58 may transfer heat from one locker 36 to an adjacent locker 36 through upper wall 60, the lower wall 62, the rack 82, the lower air flow passage 86, and/or the upper air flow passage 88.

Figure 2D:
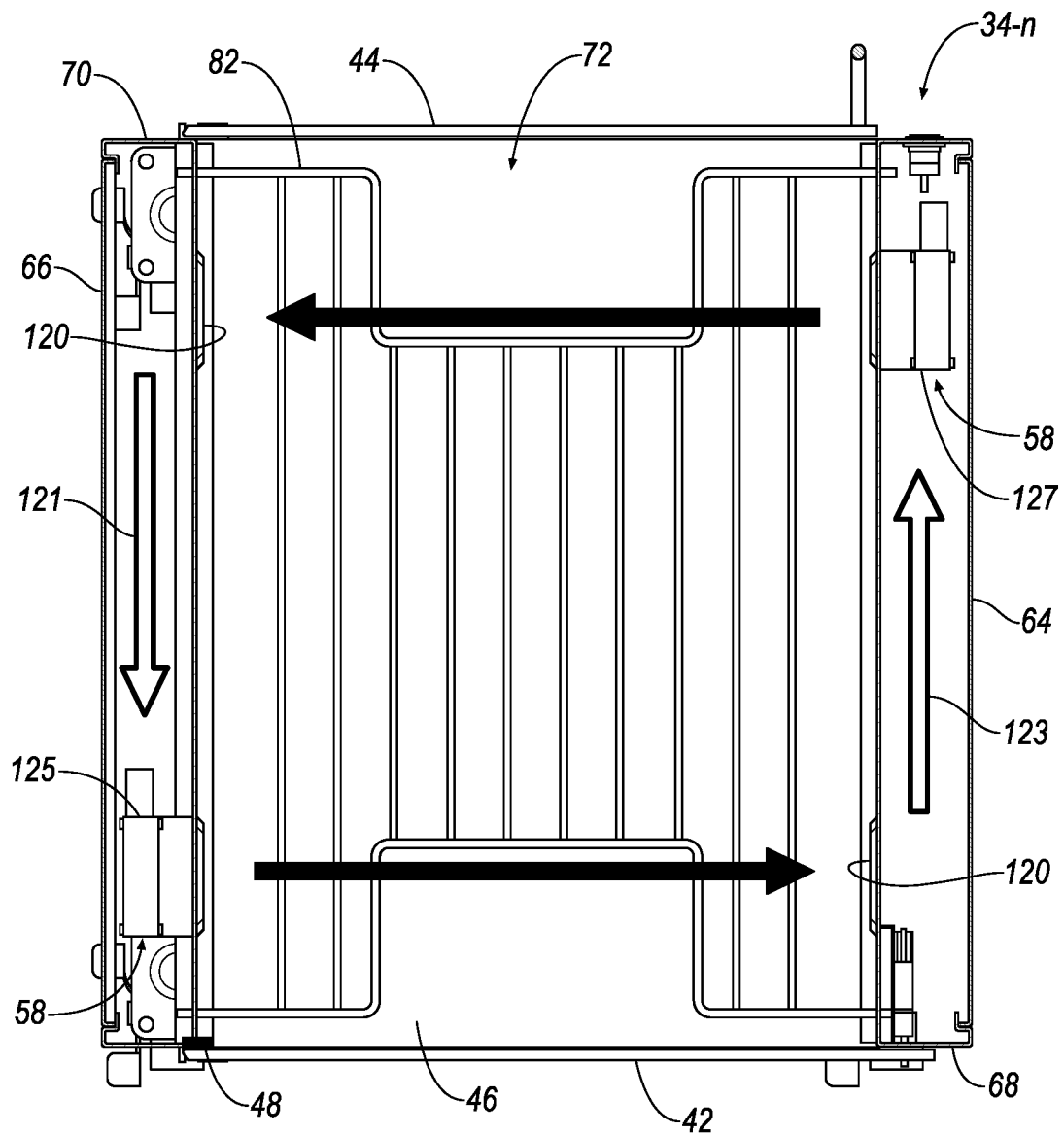
FIG. 2D is a cross-sectional view of an example food locker in accordance with the principles of the present disclosure.

In some implementations, each locker 34 may include more than one heater 58. For example, as illustrated in FIG. 2D, in some implementations each locker 34 may include two heaters 58. A first of the heaters 58 may be disposed in, and/or otherwise supported by, the medial wall 66, and a second of the heaters 58 may be disposed in, and/or otherwise supported by, the lateral wall 64. In particular, the first of the heaters 58 may be disposed proximate the front wall 68, and the second of the heaters 58 may be disposed proximate the rear wall 70. The medial wall 66 and/or the lateral wall 64 may further include one or more air intake ports 120. For example, the medial wall 66 may include a first of the air intake ports 120, and the lateral wall 64 may include a second of the air intake ports 120. In some implementations, the first of the air intake ports 120 may be disposed proximate the rear wall 70, and the second of the air intake ports 120 may be disposed proximate the front wall 68.

As further illustrated in FIG. 2D, the first of the air intake ports 120 may be in fluid communication with the first of the heaters 58, and the second of the air intake ports 120 may be in fluid communication with the second of the heaters 58. In this regard, the medial wall 66 may include a first flow path 121 (e.g., a duct, conduit, tube, etc.), and the lateral wall 64 may include a second flow path 123 (e.g., a duct, conduit, tube, etc.). In some implementations, the medial wall 66 may include a substantially hollow portion defining the first flow path 121, and the lateral wall 64 may include a substantially hollow portion defining the second flow path 123. The first of the heaters 58 may include an inlet 125 disposed in, and/or otherwise in fluid communication with, the first flow path 121. The second of the heaters 58 may include an inlet 127 disposed in, and/or otherwise in fluid communication with, the second flow path 123.

During operation, the first of the heaters 58 may fluidly communicate with the first of the air intake ports 120, the first flow path 121, and the chamber 72, and the second of the heaters 58 may fluidly communicate with the second of the air intake ports 120, the second flow path 123, and the chamber 72. In this regard, the flow of air in and through the locker 34 may define a continuous loop or flow path. For example, air may flow (i) from the chamber 72 (e.g., proximate the rear wall 70) into the first of the air intake ports 120, (ii) from the first of the air intake ports 120 into the first flow path 121, (iii) from the first flow path 121 into the inlet 125 of the first of the heaters 58, (iv) through the first of the heaters 58 into the chamber 72 (e.g., proximate the front wall 68), (v) from the chamber 72 (e.g., proximate the front wall 68) into the second of the air intake ports 120, (vi) from the second of the air intake ports 120 into the second flow path 123, (vii) from the second flow path 123 into the inlet 127 of the second of the heaters 58, and (viii) through the second of the heaters 58 into the chamber 72 (e.g., proximate the front wall 68). The continuous loop or flow path of air through the air intake ports 120, the flow paths 121, 123, the heaters 58, and the chamber 72 may help to ensure uniform and optimized heating of the chamber 72 and the food products 12 disposed in the chamber 72.

As illustrated in FIG. 3, in some implementations the locker 34 may include a heater 58a coupled to the food support 46. In this regard, the heater 58a may be integrally formed with the food support 46 such that the heater 58a can be selectively activated in order to increase the temperature of the food support 46 and/or locker 34 in which the food support 46 is disposed. The heater 58a may include a heating element 122, a gasket 124, and a hot plate 126. The heating element 122 may be an electrically conductive heating element disposed on, or within a recess 128 of, the food support 46. The gasket 124 may be disposed on the food support 46 such that in an assembled configuration the gasket 124 is located between, and sealingly engaged with, the food support 46 and the hot plate 126 in order to seal the chamber 72 from the heating element 122.

The heater(s) 58, 58a may be in communication with one or more of the ordering device 16, the user input device 52, the provider input device 54, and the locker control module 50. For example, the heater(s) 58, 58a may receive an activation and/or deactivation signal from one or more of the ordering device 16, the user input device 52, the provider input device 54, and the locker control module 50. As will be explained in more detail below, in some implementations the heater 58, 58a may receive an activation signal (e.g., "ON") from the locker control module 50 or the provider input device 54 causing the heater 58, 58a to increase the temperature of one or more of the lockers 34. Similarly, the heater 58, 58a may receive a deactivation signal (e.g., "OFF") from the ordering device 16, the user input device 52, and/or the locker control module 50 removing power from the heater 58, 58a and thereby reducing the temperature of one or more of the lockers 34.

With reference to FIG. 2A, the timer 59 may be in communication with the locker control module 50, the provider input device 54, and/or the heater(s) 58, 58a. In some implementations, the timer 59 may be implemented as software within the locker control module 50. The timer 59 may receive an activation signal from the provider input device 54. As will be explained in more detail below, in some implementations the provider input device 54 may control the timer 59 to provide a predetermined amount of time T (e.g., 10 minutes, 30 minutes, 60 minutes, etc.). In this regard, the timer 59 may act as a switch in communication with the heater(s) 58, 58. In particular, the timer 59 may (i) send an activation signal (e.g., "ON") to the heater(s) 58, 58a upon receiving an activation signal from the provider input device 54, and (ii) send a deactivation signal (e.g., "OFF") to the heater(s) 58, 58a upon expiration of the predetermined amount of time T. The predetermined amount of time T may be displayed on a display disposed on the rear wall 70.

Figure 4B:
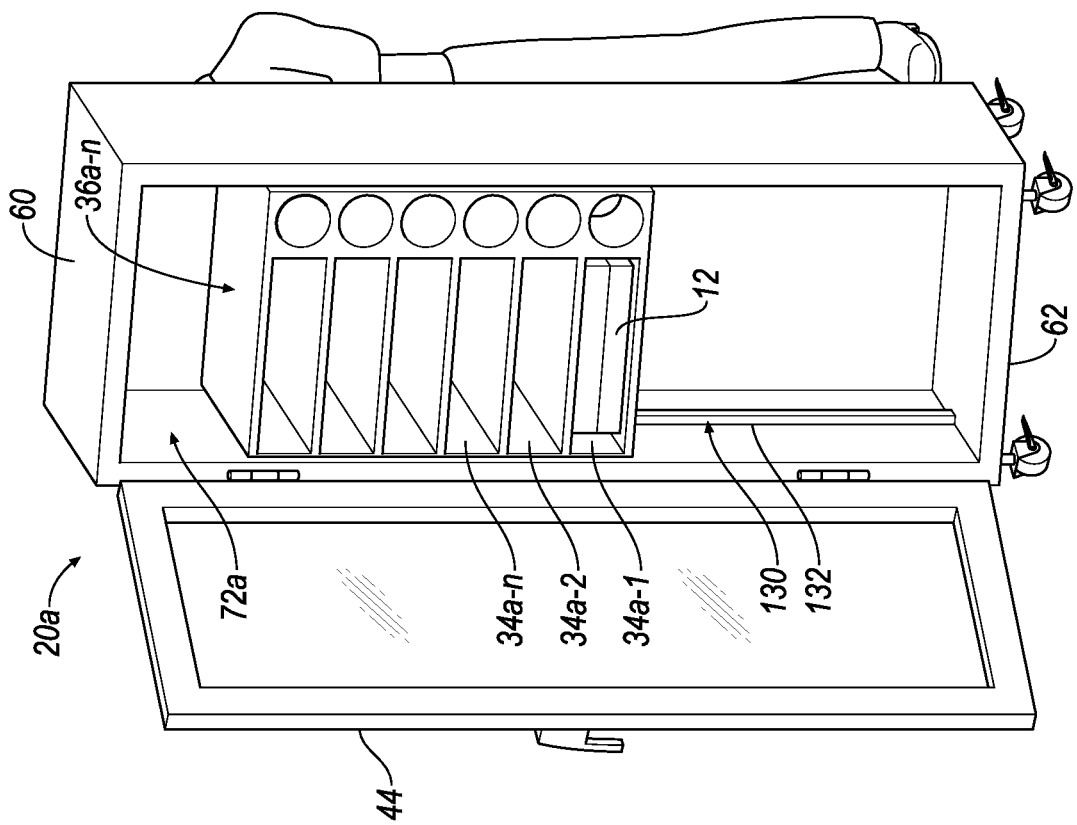
FIG. 4B is a perspective view of the food locker system of FIG. 4A.
Figure 4A:
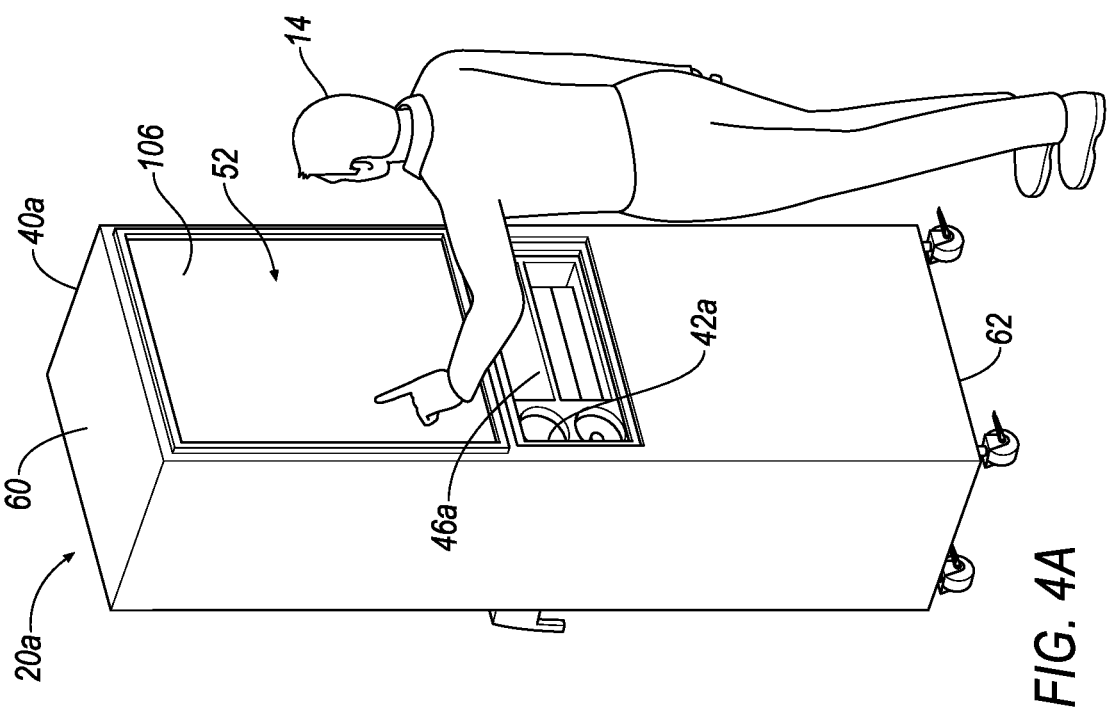
FIG. 4A is a perspective view of another example food locker system in accordance with the principles of the present disclosure.

With reference to FIGS. 4A and 4B, another locker system 20a is shown. The locker system 20a may be substantially similar to the locker system 20 except as otherwise shown or described herein. For example, the locker system 20a may be utilized with any of the food management systems (e.g., food management system 10) described herein. Accordingly, like reference numerals are used hereinafter and in the drawings to identify like components, while like reference numerals containing letter extensions are used to identify those components that have been modified.

The locker system 20a may include a housing 40a, one or more lockers 34a-1, 34a-2, . . . 34a-n and a first door 42a. In some implementations, the lockers 34a-1, 34a-2, . . . 34a-n may be arranged in one or more columns and/or stacks 36a-n. The lockers 34a-1, 34a-2, . . . 34a-n may be translatably disposed within the chamber 72a of the housing 40a. In particular, the lockers 34a-1, 34a-2, . . . 34a-n may be configured to translate within the chamber 72a from the upper wall 60 towards the lower wall 62, and vice versa. In this regard, the locker system 20a may include an elevator system 130 to translate the lockers 34a-1, 34a-2, . . . 34a-n within the chamber 72a. The elevator system 130 may include one or more of a hydraulic actuator, gears, chains, belts, pulleys, and/or other suitable mechanisms for translating the lockers 34a-1, 34a-2, . . . 34a-n within the chamber 72a. For example, as illustrated in FIG. 4B, in some implementations the elevator system 130 may include a belt 132 and a pulley (not shown) to translate the lockers 34a-1, 34a-2, . . . 34a-n within the chamber 72a. As will be explained in more detail below, the elevator system 130 may translate the lockers 34a-1, 34a-2, . . . 34a-n within the chamber 72a such that a particular one or more of the lockers 34a-1, 34a-2, . . . 34a-n, as well as the food product 12 disposed therein, is aligned with the first door 42a.

Figure 5:
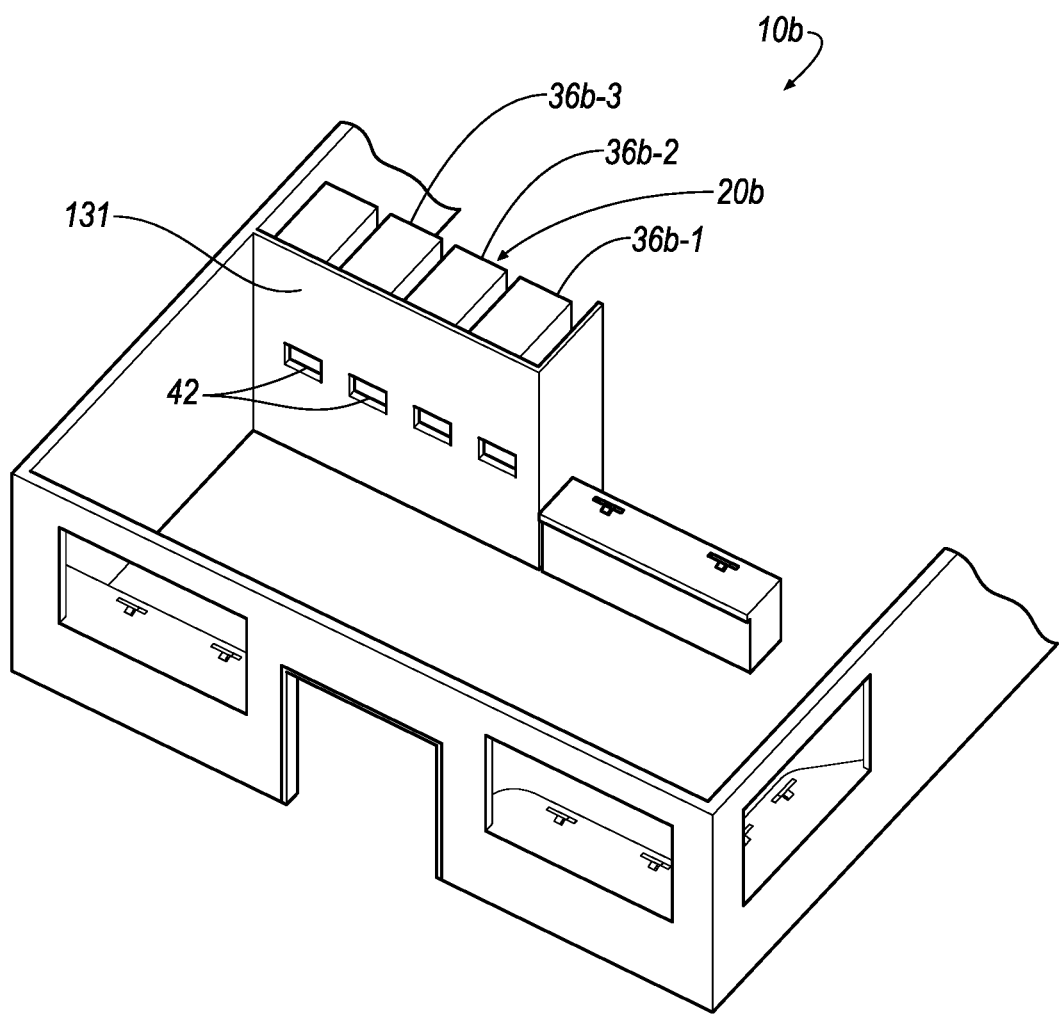
FIG. 5 is a perspective view of another example food management system in accordance with the principles of the present disclosure.
Figure 6:
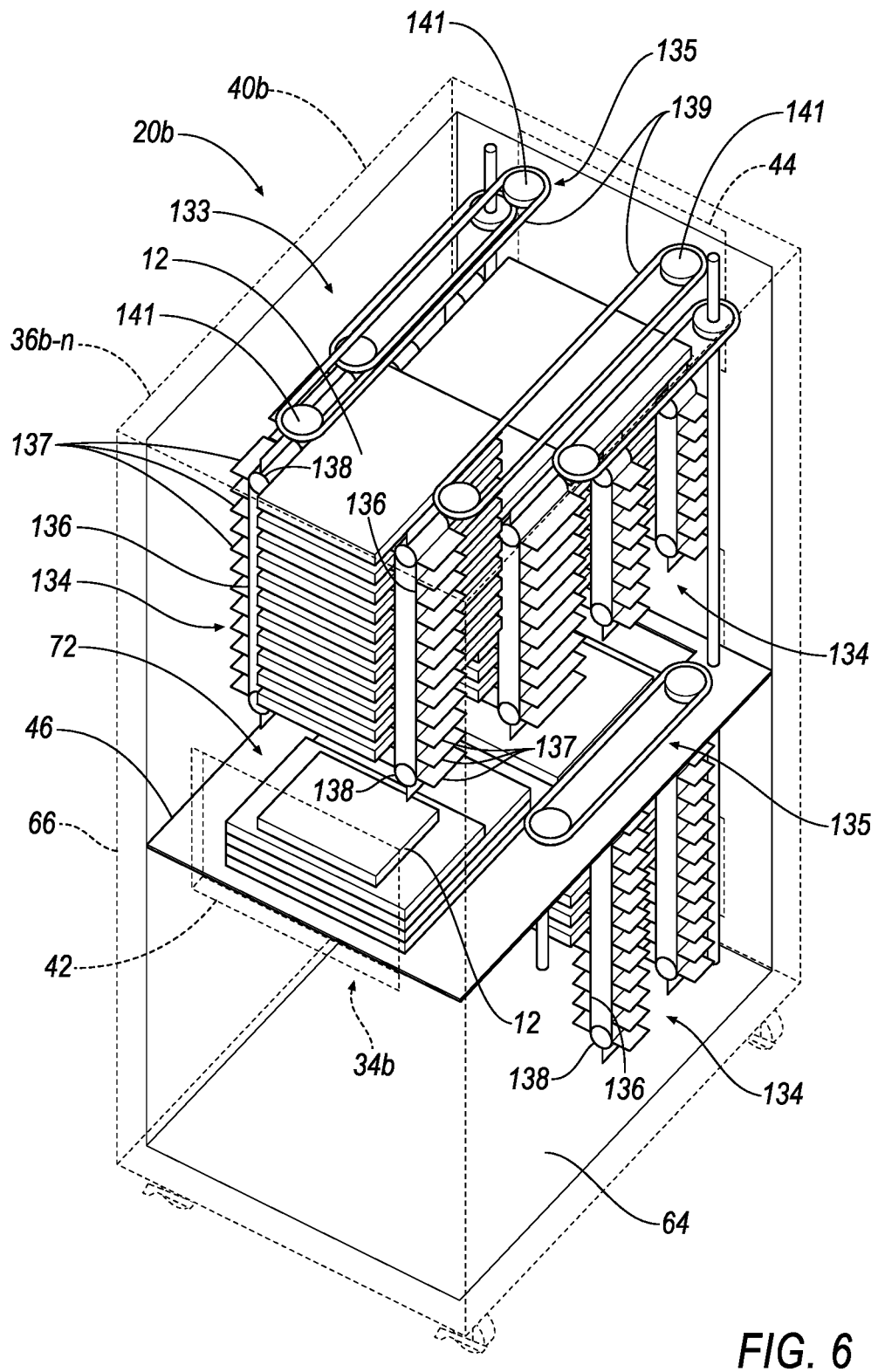
FIG. 6 is a perspective view of another example food locker system in accordance with the principles of the present disclosure.

With reference to FIGS. 5 and 6, another locker system 20b for use with a food management system 10b is shown. The locker system 20b and the food management system 10b may be substantially similar to the locker system 20 and food management system 10 except as otherwise shown or described herein. In this regard, while the locker system 20b is illustrated in the food management system 10b, it will be appreciated that the locker system 20b may be utilized with any of the food management systems (e.g., food management system 10) described herein. Accordingly, like reference numerals are used hereinafter and in the drawings to identify like components, while like reference numerals containing letter extensions are used to identify those components that have been modified.

As illustrated in FIG. 5, the locker system 20b may be disposed behind a wall 131 such that the front wall 68 is covered by the wall 131, and only the first door 42 is visible and/or exposed. With reference to FIG. 6, the locker system 20b may include a housing 40b, one or more lockers 34b-1, 34b-2, . . . 34b-n arranged in one or more stacks 36b-1, 36b-2, . . . 36b-n, and a conveyance system 133. The conveyance system 133 may include a first conveyor 134 and a second conveyor 135. The first conveyor 134 may convey the food product 12 in a first direction, and the second conveyor 135 may convey the food product 12 in a second direction transverse to the first direction. For example, the first conveyor 134 may convey the food product 12 in one of a horizontal and vertical direction, and the second conveyor 135 may convey the food product 12 in the other of the horizontal and vertical direction.

The first conveyor 134 may include a one or more belts 136 and one or more flippers 137. The belts 136 may be coupled to one or more pulleys 138, such that rotation of the pulleys 138 causes the belt 136 to move in the first direction. In some implementations, a first of the belts 136 may be disposed proximate the medial wall 66 of the housing 40b, and a second of the belts 136 may be disposed proximate the lateral wall 64 of the housing 40b. The flippers 137 may be supported by and/or coupled to an outer surface of the belts 136. Accordingly, as the belt 136 moves in the first direction, the flippers 137 similarly move in the first direction.

The second conveyor 135 may include one or more belts 139 coupled to one or more pulleys 141, such that rotation of the pulleys 141 causes the belts 139 to move in the second direction. During operation of the conveyance system 133, the first conveyor 134, the food product 12 may be supported by a pair of opposed flippers 137, such that moving the belts 136 and/or flippers 137 in the first direction can move the food product 12 in the first direction. Once the food product 12 is aligned with the second conveyor 135 (e.g., the food product 12 is engaged with the belt 139), moving the belt 139 in the second direction can move the food product 12 in the second direction. In this way, the food product 12 can loaded into the locker system 20b (e.g., through one or more second door 44), stored in the locker system 20b, conveyed within the locker system 20b, and distributed from the locker system 20b (e.g., through the first door 42). In particular, the food product 12 can be loaded into and thereafter distributed from the locker system 20b on a first-in, first-out basis.

In some implementations, the locker system 20b may be combined with one or more of the other locker systems 20, 20a. For example, in the stackable arrangement of lockers 34 described above, an upper or lower portion of the locker system 20 may include the locker 34b, and the other of the upper and lower portions of the locker system 20 may include one or more of the lockers 34 and/or the lockers 34a.

Figure 7:
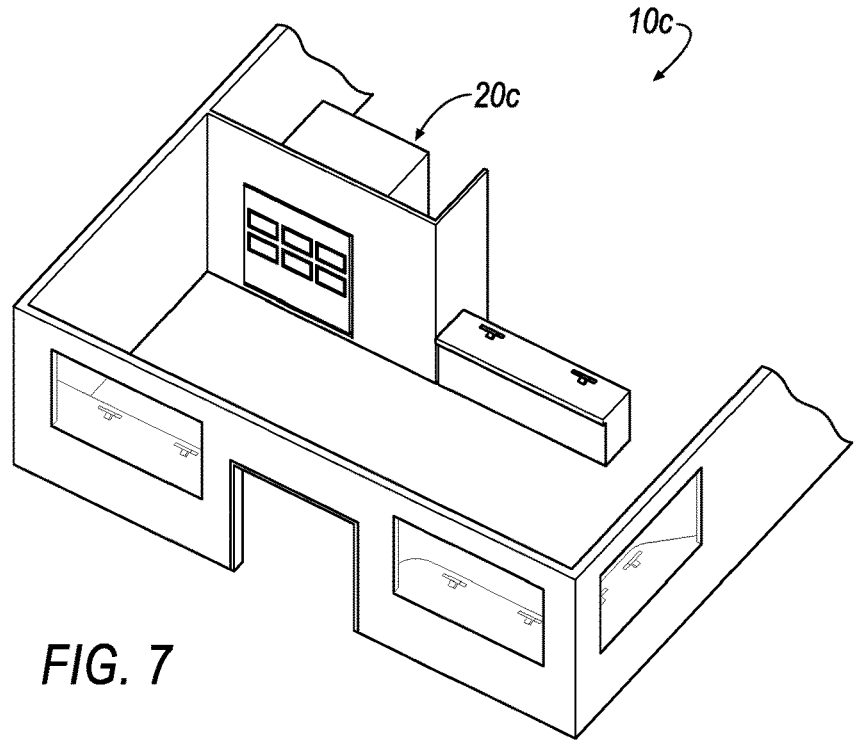
FIG. 7 is a perspective view of another example food management system in accordance with the principles of the present disclosure.
Figure 8:
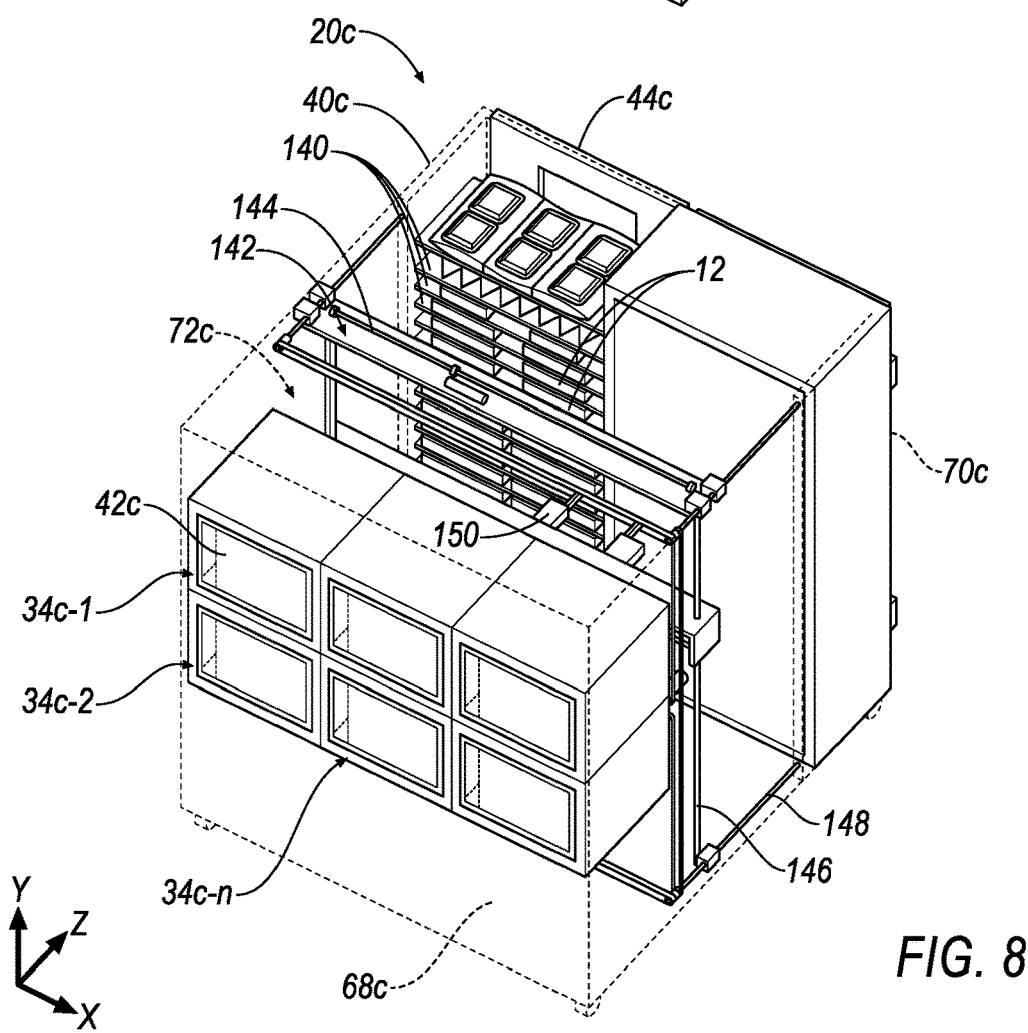
FIG. 8 is a perspective view of another example food locker system in accordance with the principles of the present disclosure.

With reference to FIGS. 7 and 8, another locker system 20c for use with a food management system 10c is shown. The locker system 20c and the food management system 10c may be substantially similar to the locker system 20 and food management system 10 except as otherwise shown or described herein. In this regard, while the locker system 20c is illustrated in the food management system 10c, it will be appreciated that the locker system 20c may be utilized with any of the food management systems (e.g., food management system 10) described herein. Accordingly, like reference numerals are used hereinafter and in the drawings to identify like components, while like reference numerals containing letter extensions are used to identify those components that have been modified.

The locker system 20c may include a housing 40c, one or more lockers 34c-1, 34c-2, . . . 34c-n, one or more first doors 42c, one or more second doors 44c, one or more food product storage compartments 140, and a loading system 142. The lockers 34c, the food product storage compartments 140, and the loading system 142 may be disposed in the chamber 72c of the housing 40c. For example, the lockers 34c may be disposed proximate the front wall 68c of the housing 40c and the food product storage compartments 140 may be disposed proximate the rear wall 70c of the housing 40c, such that the first door 42c and the second door 44c provide access to the lockers 34c and the storage compartments 140, respectively. The loading system 142 may be translatably disposed between the lockers 34c and the storage compartments 140. For example, the loading system 142 may be configured to translate in one or more dimensions (e.g., along an X-axis, along a Y-axis, and/or along a Z-axis) within the chamber 72c. In some implementations, the loading system 142 may include a first track 144, a second track 146, and a third track 148, and an arm 150. The first, second, and third tracks 144, 146, 148 may be aligned with, or substantially parallel to, the X-, Y-, and Z-axes, respectively. The arm 150 may be translatably coupled to the first, second, and third tracks 144, 146, 148. In this regard, the arm 150 may translate along one or more of the first, second, and third tracks 144, 146, 148 to and from the storage compartments 140 and the lockers 34c. Accordingly, as will be explained in more detail below, the arm 150 may pick up food product(s) 12 from one or more of the storage compartments 140 and deposit the food product(s) 12 in one or more of the lockers 34c.

Figure 9:
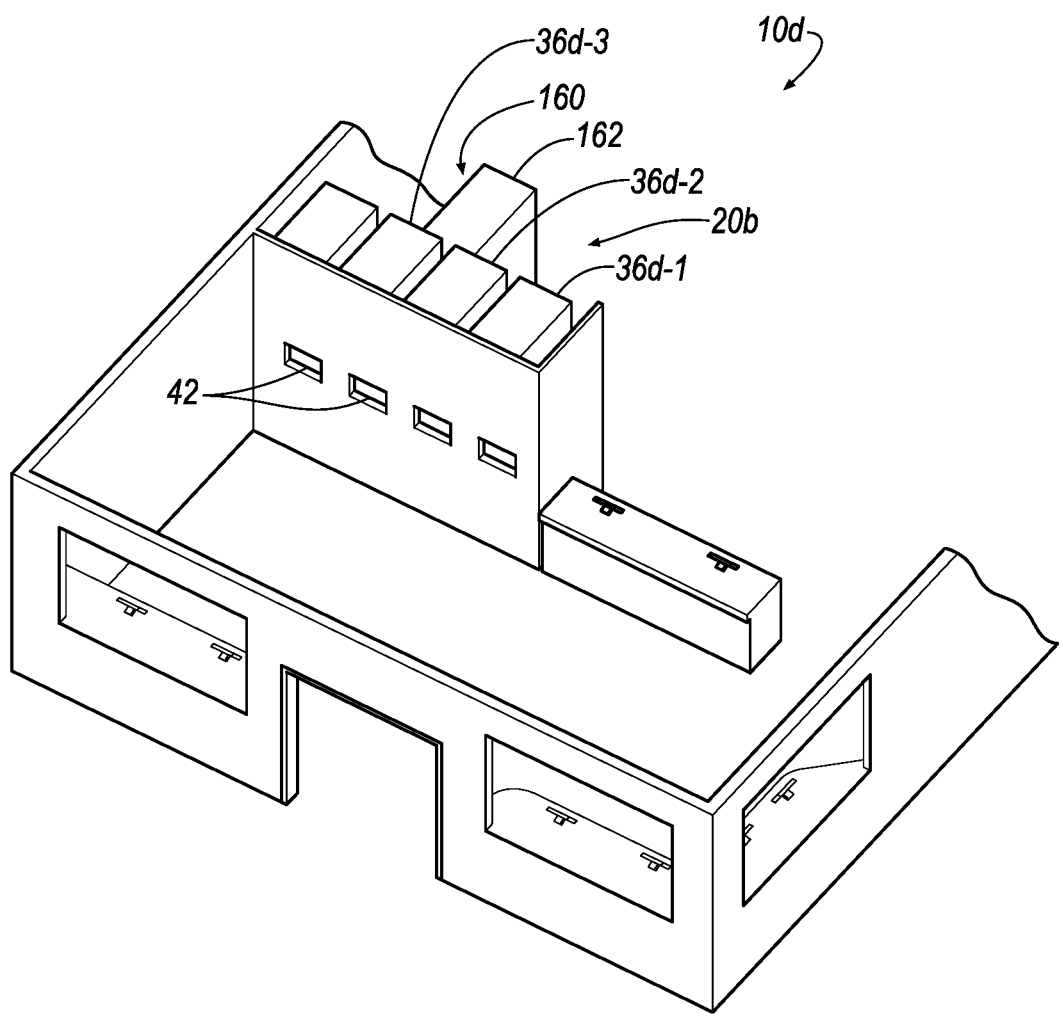
FIG. 9 is a perspective view of another example food management system in accordance with the principles of the present disclosure.

With reference to FIG. 9, another locker system 20d for use with a food management system 10d is shown. The locker system 20d and the food management system 10d may be substantially similar to the locker system 20 and food management system 10 except as otherwise shown or described herein. In this regard, while the locker system 20d is illustrated in the food management system 10d, it will be appreciated that the locker system 20d may be utilized with any of the food management systems (e.g., food management system 10) described herein. Accordingly, like reference numerals are used hereinafter and in the drawings to identify like components, while like reference numerals containing letter extensions are used to identify those components that have been modified.

The locker system 20d may include a housing 40d, one or more lockers 34d-1, 34d-2, . . . 34d-n arranged in one or more stacks 36d-1, 36d-2, . . . 36d-n, and a conveyance system 160. The conveyance system 160 may include a food storage compartment 162 storing various food products 12, and configured to move (e.g., translate) relative to the stacks 36d of lockers 34d. In this regard, the food storage compartment 162 may include wheels (e.g., wheels 38) that allow the food storage compartment 162 to move from one of the stacks 36d-n to another of the stacks 36d-n. Accordingly, during operation, the food storage compartment 162 may move from a first position in which the food storage compartment 162 is aligned with the second door 44 of one of the stacks 36d-n to a second position in which the food storage compartment 162 to aligned with the second door 44 of another of the stacks 36d-n. When the food storage compartment 162 is in the first position, the food storage compartment 162 may transfer the food product 12 from the food storage compartment 162 to the chamber 72 of the first respective stack 36d-n, and when the food storage compartment 162 is in the second position, the food storage compartment 162 may transfer the food product 12 from the food storage compartment 162 to the chamber 72 of the second of the respective stacks 36d-n.

In some implementations, the food storage compartment 162 may hold quantities of infrequently-ordered food products 12. For example, the food storage compartment 162 may store certain types of pizzas that are ordered less frequently than other types of pizzas.

Figure 10:
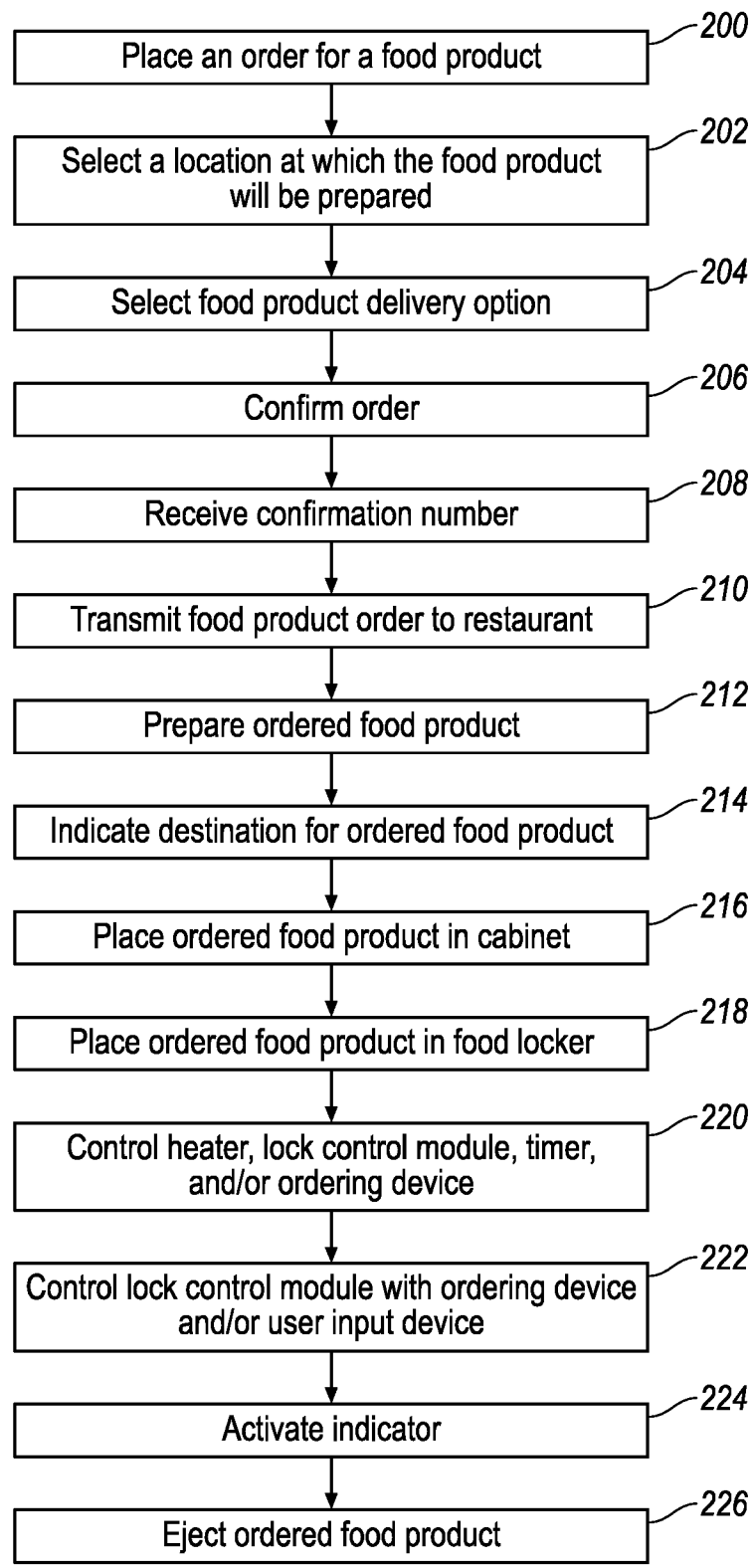
FIG. 10 is a flowchart illustrating an example method of operating a food management system in accordance with the principles of the present disclosure.

With reference to FIG. 10, an example method of operating the food management system 10-10c is shown. At 200, the user 14 may place an order for a food product 12. For example, in some implementations the user 14 may access the application 22 on the ordering device 16 and create (e.g., by selecting one or more buttons on the application 22 of the ordering device 16) an order for one or more food products 12. In other implementations, the user 14 may place an order for the food products(s) 12 by placing a telephone call to the restaurant or other establishment, or otherwise communicating with the receiving device 18.

At 202, the user 14 may select (e.g., by selecting one or more buttons on the application 22 of the ordering device 16) a location at which the food product 12 will be prepared. At 204, the user 14 may select (e.g., by selecting one or more buttons on the application 22 of the ordering device 16) whether the food product 12 will be delivered to the user 14 or picked up by the user 14 at the restaurant or other establishment. At 206, the user 14 may confirm (e.g., by selecting one or more buttons on the application 22 of the ordering device 16) the accuracy the order for the food product 12.

At 208, user 14 may receive an identification code (e.g., a confirmation number) associated with the order for the food product. For example, the user 14 may receive, via the ordering device 16, a text message, telephone call, email, or other message containing the identification code associated with the order. In some implementations, the ordering device 16 may wirelessly (e.g., WiFi, LTE, etc.) receive the identification code from the food management system 10.

At 210, the order may be transmitted to one or more other computing devices associated with the restaurant or other food establishment. For example, the receiving device 18 may transmit the order to a computer 160 (e.g., FIGS. 1A and 1B) that is accessible by the employee 30 of the restaurant. At 211, the order may be prepared by the employee 30. For example, the employee 30 may create the ordered food product 12 and/or place the ordered food product 12 in an oven 162 (e.g., FIGS. 1A and 1B)

At 212, the system 10 may indicate a destination for the ordered food product 12. For example, the system 10 may indicate whether the food product 12 is being delivered to the user 14 or delivered to a locker system (e.g., locker system 20).

At 214, the food product 12 may be marked with a label 164 (e.g., FIG. 2B) and/or an identification code 166 (e.g., a barcode or a quick-response code). The identification code 166 may include a variety of information related to the ordered food product 12 and/or the particular user 14 associated with the ordered food product 12. For example, the identification code 166 may include the date and/or time at which the ordered food product 12 was made, the date and/or time at which the ordered food product 12 expires or should otherwise be removed from food management system 10 (e.g., from the locker system 20 and/or the cabinet 168), the name or type of the ordered food product 12, a name or a confirmation number corresponding to the particular user 14 associated with the ordered food product 12.

At 214, the ordered food product 12 may be placed in a storage cabinet (e.g., cabinet 168 in FIGS. 1A and 1B), and at 216 the ordered food product 12 may be placed in one of the lockers 34 of the locker system 20. In this regard, at 216, the employee 30 may scan the identification code 166 with the provider input device 54 corresponding to a particular one of the lockers 34 and/or activate a switch (e.g., a push-button) on the locker system 20 to designate the particular one of the lockers 34 in which the ordered food product 12 is located. In this regard, each locker 34 may include an illuminated push button proximate the rear wall 68. The illuminated push button may illuminate in a variety of colors (e.g., red, green, yellow) to indicate a status of the locker 34. For example, the button may illuminate red when the locker 34 is holding an ordered food product 12. The button may illuminate green when the locker 34 is empty. The button may illuminate in a flashing manner when an identification code 166 has been scanned and the locker system 20 is waiting for the employee 30 to select a particular locker 34 in which to place the ordered food product 12.

In some implementations, the system 10 may instruct the employee 30 to place the ordered food product 12 in a particular one of the lockers 34 by illuminating the button. For example, the system 10 may illuminate the button of a particular locker 34 in a particular color to notify the employee 30 that the ordered food product 12 is to be placed in the particular locker 34. In this way, the system 10 can ensure that the lockers 34 are loaded with food products 12 in a predetermined order that optimizes the use of the lockers 34. For example, in some implementations, the system 10 may ensure that locker 34-1 is loaded first, that locker 34-2 is loaded second, and that locker 34-3 is loaded third in order to minimize the amount of time the customer 14 is required to wait before obtaining the ordered food product 12 from the locker 34. In some implementations, the system 10 may instruct the employee 30 to load a locker 34 at a first height prior to loading a locker 34 at a second height or a locker 34 at a third height, where the second height is lower than the first height and the third height is higher than the first height. In this way, the system may ensure that lockers 34 that are easy to access are utilized before lockers 34 that are more difficult to access.

The provider input device 54 may receive a variety of information from the identification code 166. For example, the provider input device 54 may receive the date and/or time at which the ordered food product 12 was made, the data and/or time at which the ordered food product 12 expires or should otherwise be removed from food management system 10 (e.g., from the locker system 20 and/or the cabinet 168), the name or type of the ordered food product 12, and/or the name or the confirmation number corresponding to the particular user 14 associated with the ordered food product 12.

At 218, the provider input device 54 may communicate with the heater 58, 58a, the locker control module 50, the timer 59, the ordering device 16, and/or the user input device 52. For example, at 218, the provider input device 54 may send an activation signal to the heater 58, 58a associated with the particular locker 34 in which the ordered food product 12 has been assigned, such that the heater 58, 58a increases the temperature of the locker 34 to a predetermined value. For example, the heater 58, 58a may increase the temperature of the locker 34 to between 100 deg. F. and 180 deg. F. In some implementations, the heater 58, 58a may increase the temperature of the locker 34 to between 155 deg. F. and 165 deg. F.

While the heater 58, 58a is described herein as receiving an activation signal based on the association of an ordered food product 12 with a particular locker 34 (e.g., placement of the ordered food product 12 in the locker 34, scanning the identification code 166 of an ordered food product with the provider input device 54 of a particular locker 34), in some implementations the heater 58, 58a may receive an activation signal based on one or more other factors in order to optimize the amount of energy used by the heaters 58, 58a. In particular, the system 10 may minimize the amount of energy used by the heaters 58, 58a, while ensuring that the system 10 provides heat to each of the ordered food products 12.

In some implementations, the heater 58, 58a may receive an activation signal based on a predicted number of orders that will be placed for one or more particular food products 12. In particular, the food management system 10 may estimate the number of orders that will be placed for a food product 12 during a predetermined period of time (e.g., 5:00 p.m.-6:00 p.m.). The heater 58, 58a may receive an activation signal based on the estimated number of orders of the food product 12. For example, if the estimated number of orders is less than a predetermined threshold, the system 10 may send an activation signal to a first quantity (e.g., 0, 1, 2, etc.) of the heaters 58, 58a associated with particular lockers 34. If the estimated number of orders is greater than the predetermined threshold, the system 10 may send an activation signal to a second quantity (e.g., 1, 2, 3, etc.) of the heaters 58, 58a associated with particular lockers 34, where the second quantity is greater than the first quantity.

In some implementations, the heater 58, 58a may receive an activation signal based on the receipt and/or processing of a particular order for a food product 12. In particular, the system 10 may activate one or more heaters 58, 58a upon receipt of an order for a food product 12 in order to preheat one or more lockers 34 in preparation for placement of the food product 12 in the locker(s) 34. For example, the system 10 may activate a heater 58, 58a upon receipt of an order from the ordering device 16.

The provider input device 54 may also send an activation signal to the locker control module 50 associated with the particular locker 34 in which the ordered food product 12 has been assigned. In this regard, the provider input device 54 may send an activation signal instructing the locker control module 50 to lock the locking mechanism 48.

In some implementations, the provider input device 54 and/or the locker control module 50 may further send an activation signal to the timer 59 associated with the particular locker 34 in which the ordered food product 12 has been assigned. For example, the provider input device 54 may assign the predetermined amount of time T or an expiration time Tx to the timer 59. In this regard, when an ordered food product 12 is sensed (e.g., scanned) by the provider input device 54 and placed in a particular locker 34, the provider input device 54 may also sense (e.g., scan) the expiration time Tx and transmit the expiration time Tx to the locker control module 50. The locker control module 50 may count down to the expiration time Tx. In this regard, the timer 59, or other display proximate the rear wall 70, may display the time remaining until the expiration time Tx for each food locker 34.

The provider input device 54 may also send a signal to the ordering device 16. For example, the provider input device 54 may send (e.g., wirelessly and indirectly through the food management system 10) a code to the ordering device 16. The code may correspond to the particular locker 34 in which the ordered food product 12 has been assigned. In particular, the code may allow the user 14 to actuate (e.g., unlock) the locking mechanism 48 in order to access the food product 12 through the first door 42 of the particular locker 34 in which the food product 12 has been assigned.

The provider input device 54 may also send a variety of information to a portion of the user input device 52 (e.g., touchscreen 106) for display. For example, the provider input device 54 may send to the touchscreen 106 the name of the user 14 and/or the locker number associated with the locker 34 in which the ordered food product 12 is located. The name of the user 14 and/or the locker number may be displayed on the touchscreen 106, for example, of the user input device 52.

At 220, the ordering device 16 and/or the user input device 52 may communicate with the locker control module 50 in order to unlock the locking mechanism 48 associated with the particular locker 34 in which the ordered food product 12 has been assigned. For example, in some implementations, the ordering device 16 may wireless transmit (e.g., WiFi, BLUETOOTH®, BLE, near field communication, etc.) to the locker control module 50 the code received at 218. In other implementations, the user 14 may enter, the via the user input device 52, the code received at 218. Upon entering and/or transmitting the code by the user input device 52 or the ordering device 16, the locker control module 50 may control the locking mechanism 48 to unlock the first door 42.

At 222, the method may activate the indicator 56 associated with the particular locker 34 in which the ordered food product 12 has been assigned. For example, in some implementations the indicator 56 may provide a light on at least one of the first door 42 and the front wall 70 of the housing 40 to notify the user 14 of the locker 34 in which the ordered food product 12 is located. In some implementations, one or both of the indicator 56 and the user input device 52 (e.g., touch screen display) may identify the user 14. For example, the indicator 56 (e.g., a speaker) may produce an audible recitation of the name, or other identifying information (e.g., code, confirmation number, etc.) of the user 14, and/or the user input device 52 may display the name and/or confirmation number of the user 14.

Upon opening the first door 42, at 224 the method may include ejecting at least a portion of the food support 46 and the ordered food product 12 from the chamber 72 through the first opening 76 such that the user can retrieve the food product 12 from the locker 34.

In the event the ordered food product 12 is not removed from the locker 34 through the first door 42, the food management system 10 may manage the removal of the ordered food product 12 through the second door 44. In this regard, in some situations the user 14 may not retrieve the ordered food product 12 from the food locker 34, or the user 14 may attempt to retrieve the ordered food product from a drive-thru window or at a service counter of the restaurant. In such situations, the employee 30 may retrieve the ordered food product 12 from the locker 34 through the second door 44. Upon removing the ordered food product 12 through the second door 44, the employee 30 may scan the identification code 166 with the provider input device 54 corresponding to the particular locker 34 and/or activate a switch (e.g., a push-button) on the particular locker 34 in which the ordered food product 12 is located.

Upon removing the food product 12 from the locker 34 and scanning the identification code 166, the employee 30 may be prompted by the provider input device 54 or another provider input device (e.g., a touchscreen or keypad proximate the rear wall 68 of the housing 40) to enter a reason for removal of the ordered food product 12 through the second door 44. In this regard, in some implementations the employee 30 may be prompted to enter a reason for removal from a list of available reasons. The list of available reasons may include, sending the ordered food product 12 to waste, delivering the ordered food product 12 to the user 14 through a drive-thru window, or delivering the ordered food product 12 to the user 14 at a service counter. In some implementations, the timer 59 may communicate with the provider input device 54 or another provider input device (e.g., a touchscreen proximate the rear wall 68 of the housing 40) upon expiration of the predetermined amount of time T, such that the employee 30 is notified that the predetermined amount of time T has expired. In this regard, the timer 59 may include a display indicating the remaining amount of the predetermined amount of time T. The employee 30 may then be prompted, through the provider input device, to remove the ordered food product 12 from the locker 34 upon expiration of the predetermined amount of time T. In some implementations, the locker control module 50 may send a deactivation signal to the heater 58, 58a upon expiration of the predetermined amount of time T.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A method of managing the delivery of a food product with a food locker system, the method comprising:
   receiving an order for a food product from an ordering device;
   preparing the food product associated with the order;
   activating a first identifier at a first side of a food locker, the food locker having a locker control module and a first door covering a first opening of a chamber, the first identifier identifying the first door;
   placing the food product in the chamber of the food locker;
   transmitting an identification code to the ordering device, the identification code associated with the order for the food product;
   transmitting the identification code from at least one of the ordering device and a user input device to the locker control module and activating a second identifier at a second side of the food locker, the second identifier remote from the first identifier, and the second identifier identifying a second door covering a second opening of the chamber; and unlocking the second door such that the food product is accessible through the second opening.

2. The method of claim 1, wherein transmitting the identification code from at least one of the ordering device and the user input device includes wirelessly transmitting the identification code from the ordering device to the food locker system.

3. The method of claim 1, further comprising activating an indicator associated with the food locker.

4. The method of claim 3, wherein the indicator includes at least one of a speaker, a display, and a light associated with the food locker.

* * * * *